United States Patent
Hattori et al.

(10) Patent No.: US 9,207,939 B2
(45) Date of Patent: Dec. 8, 2015

(54) PERFORMING SHADOWING FUNCTION BY VIRTUAL MACHINE MANAGER IN TWO-LEVEL VIRTUAL MACHINE ENVIRONMENT

(75) Inventors: Naoya Hattori, Yokohama (JP); Toshiomi Moriki, Kokubunji (JP); Yoshiko Yasuda, Tokorozawa (JP)

(73) Assignee: HITACHI, LTD., Tokyo (JP)

( * ) Notice: Subject to any disclaimer, the term of this patent is extended or adjusted under 35 U.S.C. 154(b) by 1348 days.

(21) Appl. No.: 12/980,549

(22) Filed: Dec. 29, 2010

(65) Prior Publication Data

US 2011/0197190 A1 Aug. 11, 2011

(30) Foreign Application Priority Data

Feb. 5, 2010 (JP) ................. 2010-023872

(51) Int. Cl.
*G06F 9/455* (2006.01)
*G06F 9/30* (2006.01)

(52) U.S. Cl.
CPC ........ *G06F 9/30076* (2013.01); *G06F 9/30101* (2013.01); *G06F 9/30181* (2013.01); *G06F 9/45558* (2013.01); *G06F 2009/45566* (2013.01)

(58) Field of Classification Search
None
See application file for complete search history.

(56) References Cited

U.S. PATENT DOCUMENTS

| 4,792,895 | A | 12/1988 | Tallman |
| 7,127,548 | B2 * | 10/2006 | Bennett et al. ............ 711/6 |

| 2009/0007112 | A1 | 1/2009 | Moriki et al. |
| 2009/0327575 | A1 * | 12/2009 | Durham et al. ............ 711/6 |
| 2010/0115513 | A1 | 5/2010 | Moriki et al. |

FOREIGN PATENT DOCUMENTS

| JP | 2009-3749 A | 1/2009 |
| JP | 2010-108271 A | 5/2010 |

OTHER PUBLICATIONS

P. Buckle, How to Install ESX 4.0 on Workstation 6.5.2 as a VM, http://xtravirt.com/sd10089, retrieved Jan. 7, 2010.
A. Kivity, Avi Kivity's blog, http://avikivity.blogspot.com/2008/09/nested-svm-virtualization-for-kvm.html, posted Sep. 2, 2008, retrieved Dec. 24, 2009.

* cited by examiner

*Primary Examiner* — Meng An
*Assistant Examiner* — James J Lee
(74) *Attorney, Agent, or Firm* — Mattingly & Malur, PC

(57) ABSTRACT

There is a need for providing the Xeon CPU with a two-level VM that is independent of VMM types and prevents the throughput from degrading when the OS operates the privilege register. A machine is provided with a processor and memory. The machine includes a first virtual machine manager for managing a virtual machine, a second virtual machine for managing an operating system, first management information, and second management information. The processor is provided with a register and a shadowing function. The machine uses a virtualization method. The first virtual machine manager detects a call from the second virtual machine manager. The first virtual machine manager enables the shadowing function when it is determined that an instruction for enabling the shadowing function caused the call.

14 Claims, 20 Drawing Sheets

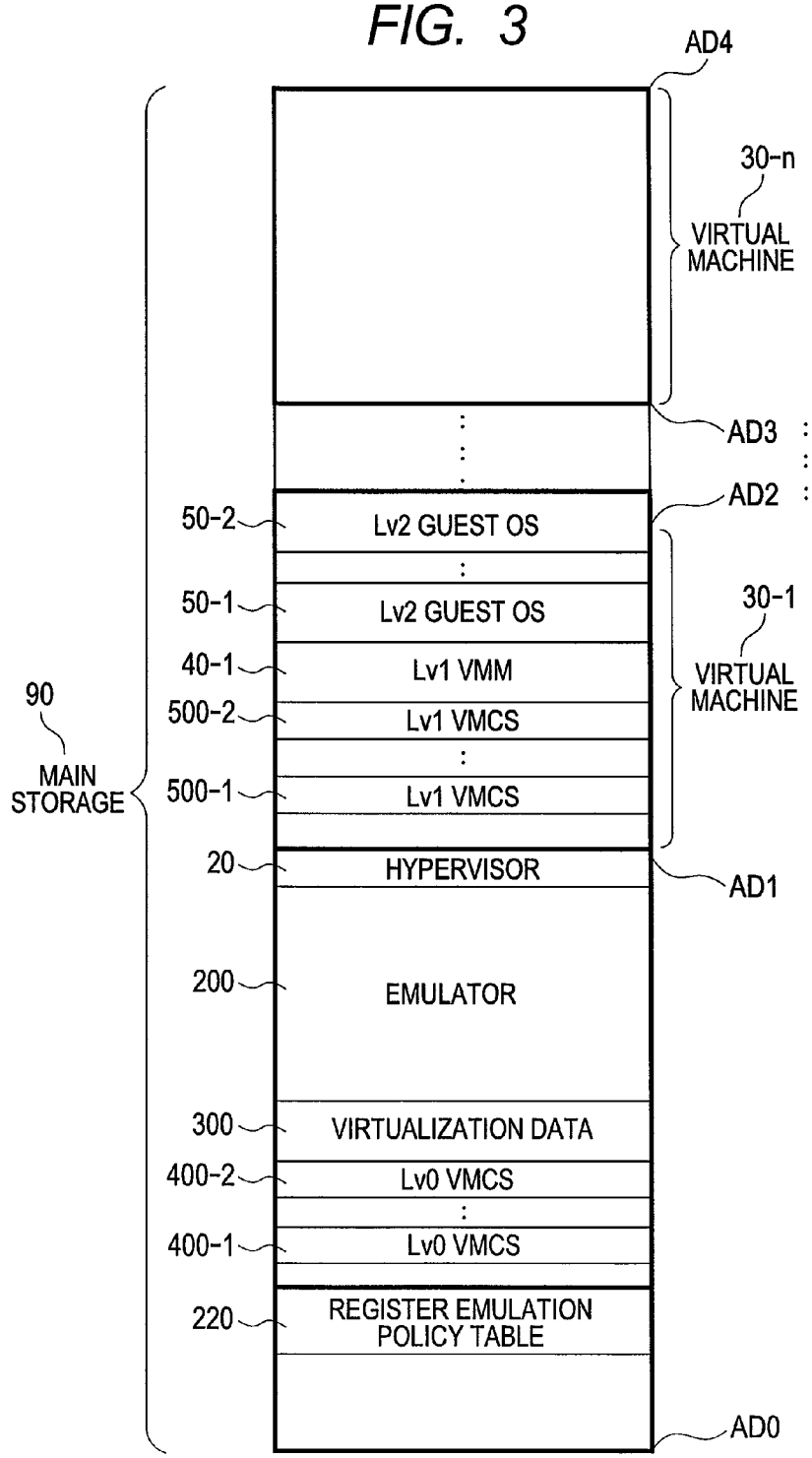

FIG. 4
REGISTER EMULATION POLICY TABLE

| REGISTER NAME | EMULATION POLICY | HYPERVISOR-SPECIFIC VALUE |
|---|---|---|
| CR0.PE | SHADOWING | 1 |
| CR0.MP | THROUGH | — |
| CR0.EM | THROUGH | — |
| CR0.TS | THROUGH | — |
| CR0.ET | THROUGH | — |
| CR0.NE | SHADOWING | 1 |
| CR0.WP | THROUGH | — |
| CR0.AM | THROUGH | — |
| CR0.NW | SHADOWING | 0 |
| CR0.CD | SHADOWING | 0 |
| CR0.PG | SHADOWING | 1 |
| CR2 | THROUGH | — |
| CR3 | THROUGH | — |
| CR4.VME | THROUGH | — |
| CR4.PVI | THROUGH | — |
| CR4.TSD | THROUGH | — |
| CR4.DE | THROUGH | — |
| CR4.PSE | THROUGH | — |
| CR4.PAE | THROUGH | — |
| CR4.MCE | SHADOWING | 1 |
| CR4.PGE | THROUGH | — |
| CR4.PCE | THROUGH | — |
| CR4.OSFXSR | THROUGH | — |
| CR4.OSXMMEXCPT | THROUGH | — |
| CR4.VMXE | SHADOWING | 1 |
| CR4.SMXE | SHADOWING | 1 |
| CR4.OSXSAVE | THROUGH | — |
| : | : | : |
| TPR | SHADOWING | 0 |
| VMCS PTR | INTERCEPT | 0x86B17000 |

FIG. 5A
GUEST STATE AREA

| FLAG NAME | GUEST-OPERATION REGISTER VALUE |
|---|---|
| Guest CR0.PE | 1 |
| Guest CR0.MP | 0 |
| ⋮ | ⋮ |
| Guest CR0.CD | 1 |
| Guest CR0.PG | 1 |
| Guest CR3 | 0x0040B000 |
| Guest CR4.VME | 0 |
| ⋮ | ⋮ |
| Guest Cr4.OSXSAVE | 0 |
| ⋮ | ⋮ |
| Guest IDTR | 0x00406000 |

FIG. 5B
GUEST STATE AREA

| FLAG NAME | GUEST-OPERATION REGISTER VALUE |
|---|---|
| Guest CR0.PE | 1 |
| Guest CR0.MP | 0 |
| ⋮ | ⋮ |
| Guest CR0.CD | 1 |
| Guest CR0.PG | 1 |
| Guest CR3 | 0x0040B000 |
| Guest CR4.VME | 0 |
| ⋮ | ⋮ |
| Guest Cr4.OSXSAVE | 0 |
| ⋮ | ⋮ |
| Guest IDTR | 0x00406000 |

FIG. 6A

SHADOWING SETTING     430

| SHADOWING TARGET NAME | SHADOWING ENABLE FLAG |
|---|---|
| CR0 Guest Host Mask.PE | 1 |
| CR0 Guest Host Mask.MP | 0 |
| ⋮ | ⋮ |
| CR0 Guest Host Mask.CD | 1 |
| CR0 Guest Host Mask.PG | 1 |
| CR4 Guest Host Mask.VME | 0 |
| ⋮ | ⋮ |
| CR4 Guest Host Mask.OSXSAVE | 0 |
| UseTprShadow | 1 |

640 / 645 / 4301

| SHADOW DATA NAME | SHADOW DATA |
|---|---|
| CR0 Read Shadow.PE | 1 |
| CR0 Read Shadow.MP | 0 |
| ⋮ | ⋮ |
| CR0 Read Shadow.CD | 0 |
| CR0 Read Shadow.PG | 1 |
| CR4 Read Shadow.VME | 0 |
| ⋮ | ⋮ |
| CR4 Read Shadow.OSXSAVE | 0 |

650 / 655 / 4302

| SHADOW DATA NAME | SHADOW DATA ADDRESS |
|---|---|
| Virtual Apic Page | 0x201C0000 |

SHADOWING SETTING

530

5301

| SHADOWING TARGET NAME (670) | SHADOWING ENABLE FLAG (675) |
|---|---|
| CR0 Guest Host Mask.PE | 1 |
| CR0 Guest Host Mask.MP | 0 |
| ⋮ | ⋮ |
| CR0 Guest Host Mask.CD | 1 |
| CR0 Guest Host Mask.PG | 1 |
| CR4 Guest Host Mask.VME | 0 |
| ⋮ | ⋮ |
| CR4 Guest Host Mask.OSXSAVE | 0 |
| UseTprShadow | 1 |

5302

| SHADOW DATA NAME (680) | SHADOW DATA (685) |
|---|---|
| CR0 Read Shadow.PE | 1 |
| CR0 Read Shadow.MP | 0 |
| ⋮ | ⋮ |
| CR0 Read Shadow.CD | 0 |
| CR0 Read Shadow.PG | 1 |
| CR4 Read Shadow.VME | 0 |
| ⋮ | ⋮ |
| CR4 Read Shadow.OSXSAVE | 0 |

5303

| SHADOW DATA NAME (690) | SHADOW DATA ADDRESS (695) |
|---|---|
| Virtual Apic Page | 0x201C0000 |

FIG. 7A

INTERCEPT SETTING

440

| INTERCEPT TARGET NAME (700) | INTERCEPT ENABLE FLAG (705) |
|---|---|
| CR3-load exiting | 0 |
| CR3-store exiting | 0 |
| CR8-load exiting | 0 |
| CR8-store exiting | 0 |
| ⋮ | ⋮ |
| MOV-DR exiting | 1 |

FIG. 7B

INTERCEPT SETTING

540

| INTERCEPT TARGET NAME (710) | INTERCEPT ENABLE FLAG (715) |
|---|---|
| CR3-load exiting | 0 |
| CR3-store exiting | 0 |
| CR8-load exiting | 0 |
| CR8-store exiting | 0 |
| ⋮ | ⋮ |
| MOV-DR exiting | 1 |

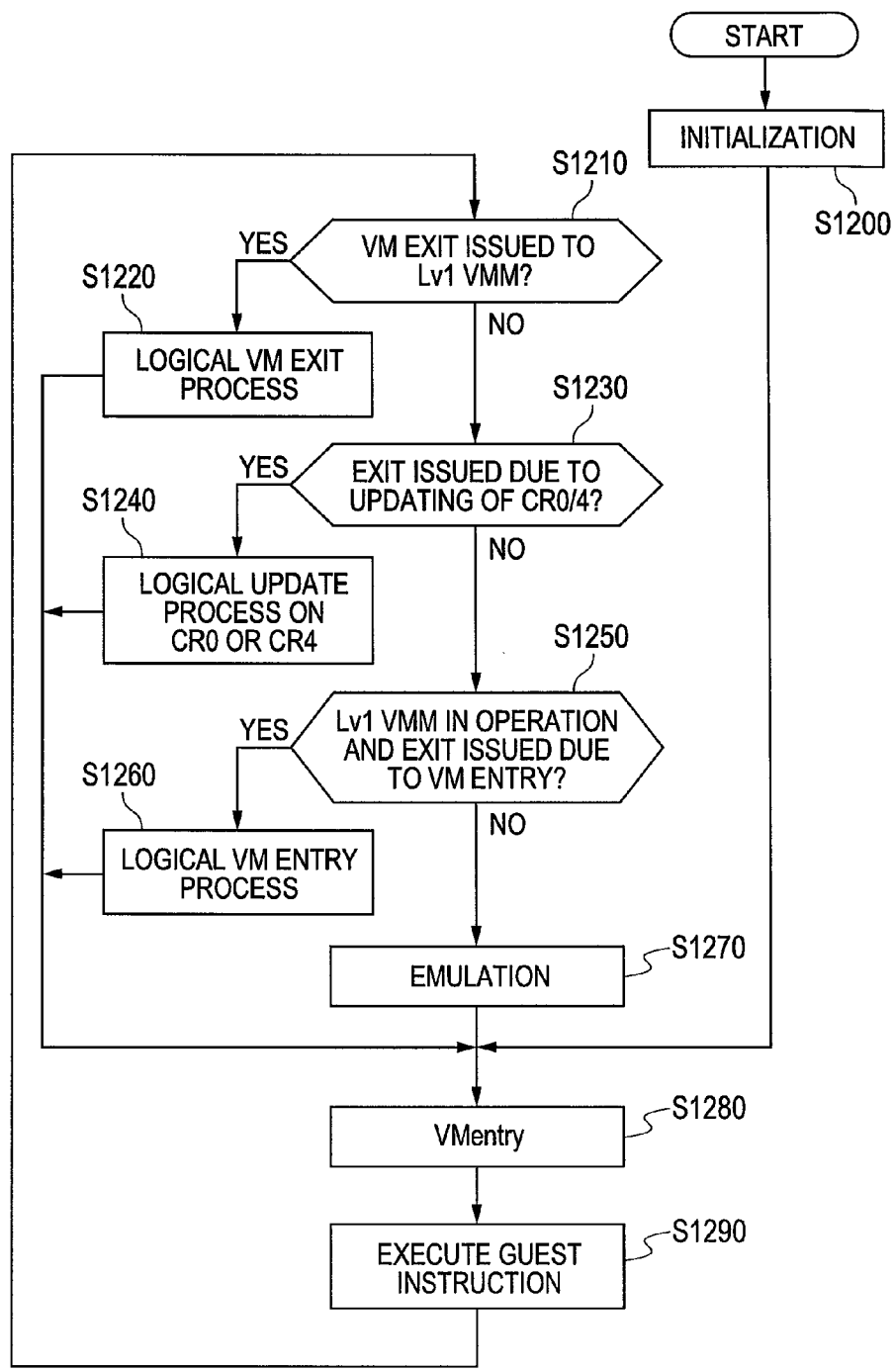

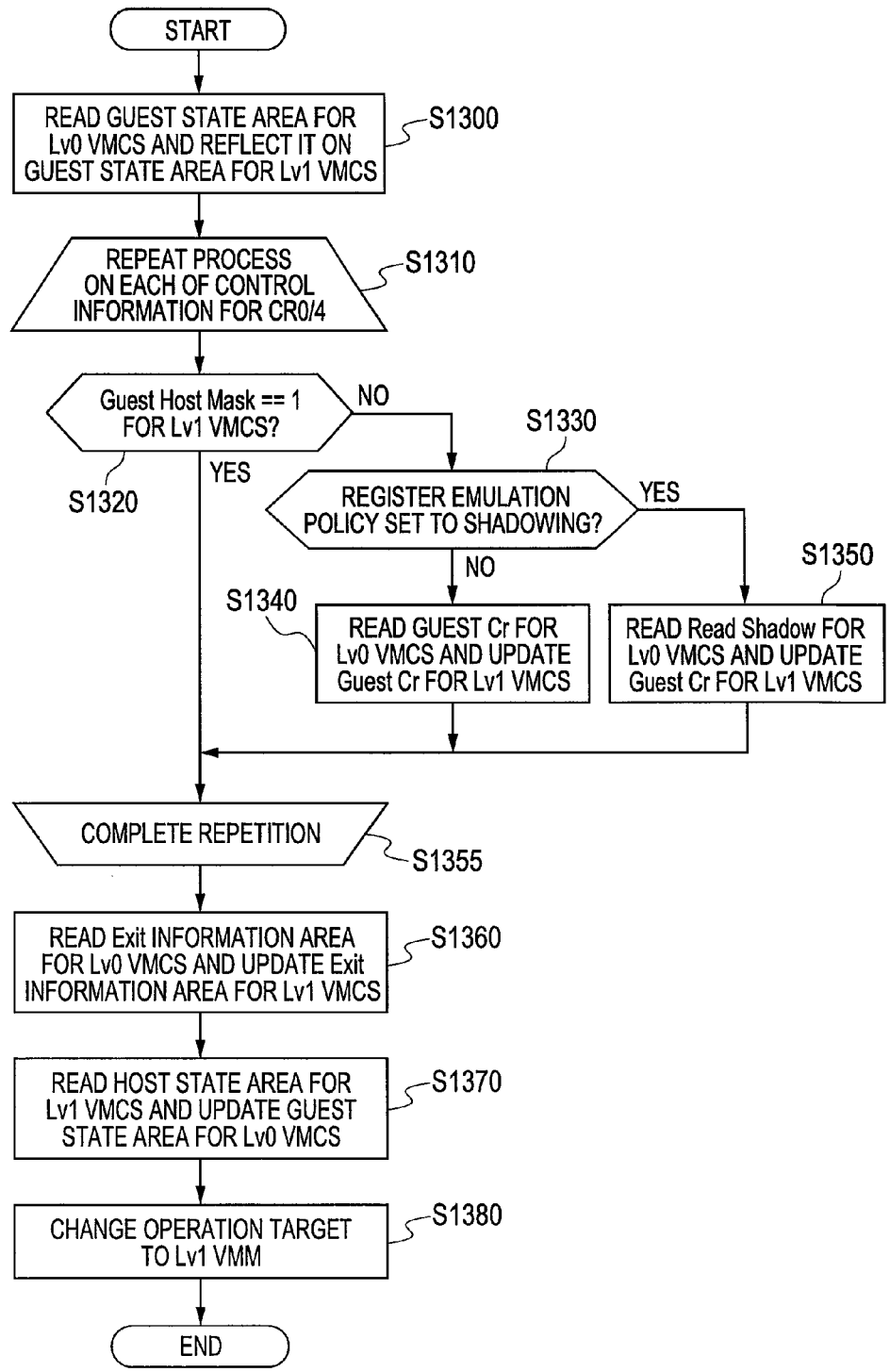

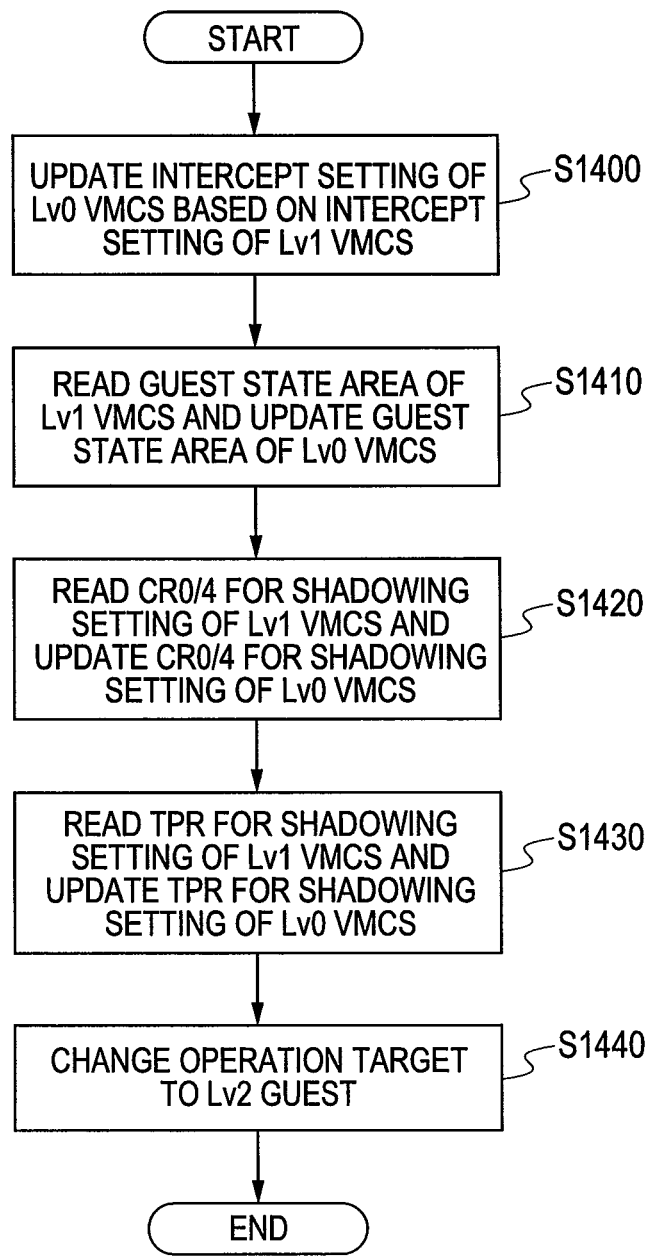

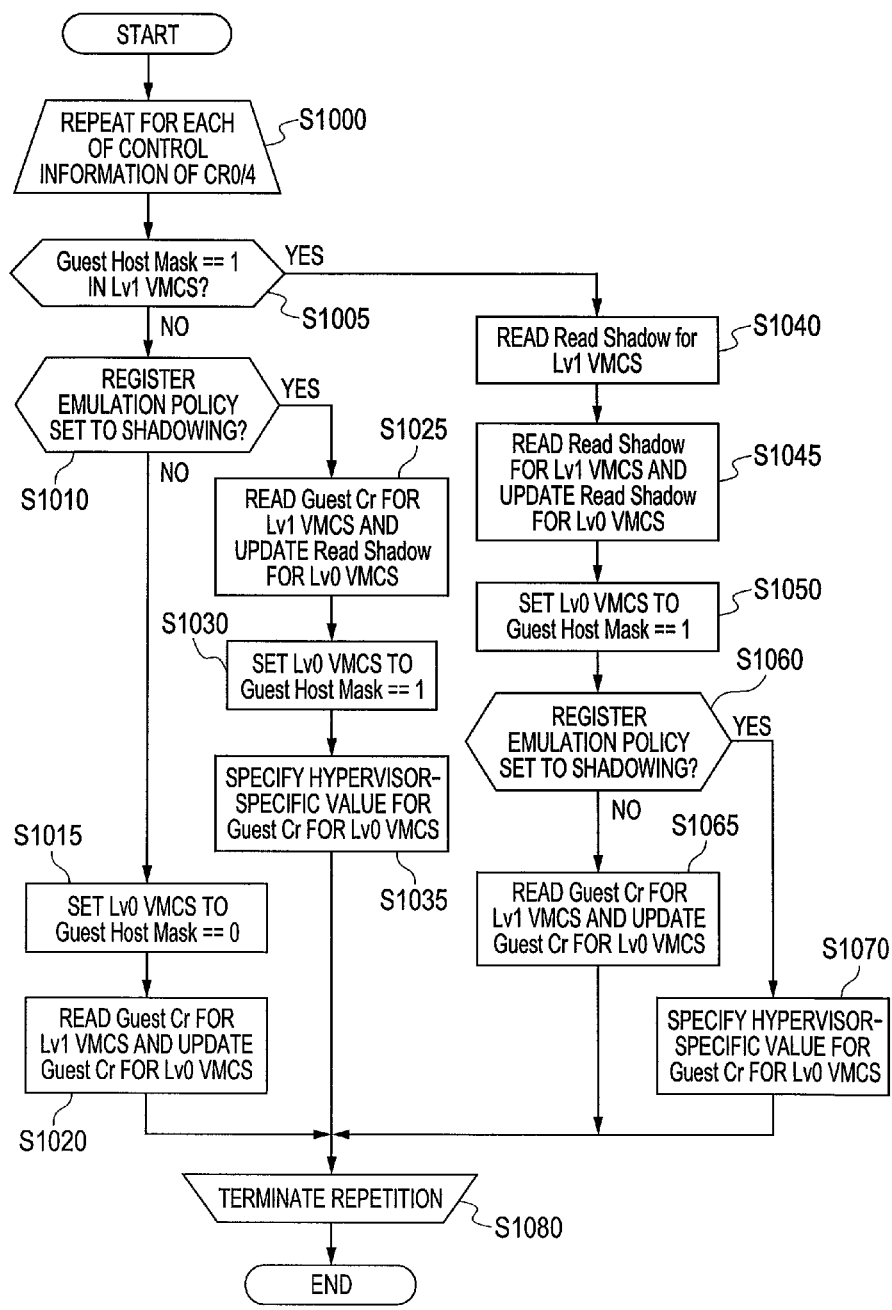

PERFORMING SHADOWING FUNCTION BY VIRTUAL MACHINE MANAGER IN TWO-LEVEL VIRTUAL MACHINE ENVIRONMENT

CLAIM OF PRIORITY

The present application claims priority from Japanese patent application JP 2010-023872 filed on Feb. 5, 2010, the content of which is hereby incorporated by reference into this application.

FIELD OF THE INVENTION

The present invention relates to a virtual machine system. More particularly, the invention relates to a virtual machine using a processor provided with a virtualization support function.

BACKGROUND OF THE INVENTION

Recently, the tendency has been to integrate many cores into server-based CPUs such as Xeon (registered trademark) CPU from Intel (registered trademark) Corporation. It is expected to integrate eight cores into one CPU as early as 2010. The many-core tendency emphasizes the enough ability of the server throughput. Virtualization software attracts lots of attention as a technique of using the excess ability and is spreading fast.

The virtualization software generates multiple virtual server environments (virtual servers) on a single physical server. Two types of virtual servers are known. One is a logical partition (LPAR) that spatially divides physical server resources such as a CPU core, memory, and I/O devices to be used. The other is a virtual machine (VM) that shares the server resources in a time sharing environment.

The virtualization software for generating and controlling the LPAR is especially referred to as a hypervisor. LPARs do not share server resources. Using this characteristics, the hypervisor can limit an effect of error occurrence on the physical server to one LPAR. The hypervisor is excellent in resistance to errors.

The virtualization software for generating and controlling a VM is especially referred to as a VM monitor (VMM). The VMM allows VMs to share server resources and operates more VMs than those appropriate for the amount of physically mounted memory. The VMM is excellent in the effective use of server resources.

The two-level VM is known as a technique of taking both advantages of LPAR and VM. The two-level VM operates the hypervisor on the physical server to generate an LPAR and further operates a VMM on each LPAR. The VMM operating on the LPAR is especially referred to as a Lv1 guest. The OS operating on the VM is especially referred to as a Lv2 guest.

The hypervisor maintains the error resistance between LPARs while the VMM effectively uses server resources on the LPAR.

The Xeon CPU is installed with the hardware feature called VT-x (Virtual Technology for IA-32 Processors) to support execution of the virtualization software.

The VT-x requires one of the hypervisor and the VMM to operate. The two-level VM causes competition for access to the VT-x feature, making normal processing unsuccessful. The following describes techniques for implementing the two-level VM in terms of the Xeon CPU.

One technique for implementing the two-level VM is to enhance the hypervisor functions and virtually provide the VT-x feature for the VMM operating in the LPAR. In addition, there is provided a function to emulate accesses to the VT-x feature in the physical CPU (e.g., see JP-A-2009-3749).

Another technique is to combine VMware Server with ESX Server, virtualization software products from VMware, Inc. (e.g., see "How to Install VMware ESX 4.0 on Workstation 6.5.2 as a VM", xtravirt.com/xd10089, retrieved from the Internet on Jan. 7, 2010). This technique enables only the software equivalent to the hypervisor to operate using VT-x. The VMM operates using the BT (Binary Translation) technology. However, there are limitations on operating systems capable of using the BT technology.

A technique for implementing the two-level VM on a mainframe is to divide a single physical machine into multiple logical partitions (LPARs). A virtual SIE (Start Interpretive Execution) instruction is executed or intercepted in the LPAR to exchange data between an SIE parameter used for the VMM and that used for the hypervisor (e.g., see U.S. Pat. No. 4,792,895).

A technique for providing the VMM with the virtualization support function of the hardware is to use KVM (Kernel-based Virtual Machine) from Red Hat, Inc. and provide virtual SVM in a virtual environment using the AMD CPU installed with the SVM function equivalent to VT-x (e.g., see Avi Kivity, "Avi Kivity's blog", avikivity.blogspot.com/2008/09/nested-svm-virtualization-for-kvm.html, posted on Sep. 2, 2008; retrieved from the Internet on Dec. 24, 2009).

SUMMARY OF THE INVENTION

The two-level VM operates two types of software (hypervisor and VMM) in addition to the OS. The throughput becomes lower than the case of operating only the OS. There are some factors to operate the two types of software. The virtual environment using the Xeon CPU frequently needs to emulate privilege register operations by the OS running on the VMM.

It is therefore an object of the present invention to provide the Xeon CPU with a two-level VM that is independent of VMM types and prevents the throughput from degrading when the OS operates the privilege register.

According to one aspect of the present invention, a virtualization method is used for a machine that is provided with a processor and memory connected to the processor. The machine includes a first virtual machine manager, a second virtual machine manager, first management information, and second management information. The first virtual machine manager is executed by the processor and manages a plurality of virtual machines generated by virtually dividing a physical resource of the machine. The second virtual machine manager is executed on each of the virtual machines and manages an operating system to execute an application. The first management information is stored in the memory by the first virtual machine manager and manages status of the first virtual machine manager and the second virtual machine manager. The second management information is stored in the memory by the second virtual machine manager and manages status of the second virtual machine manager and the operating system or the application. The processor is provided with a register and a shadowing function. The register stores control information for controlling the processor. The shadowing function reads a specified value from the first management information or the second management information in accordance with a read operation on the register. The virtualization method includes first, second, and third steps. The first step allows the first virtual machine manager to detect a call from the second virtual machine manager. The second step allows the first virtual machine manager to determine whether an instruction for enabling the shadowing function causes a call from the second virtual machine manager. The third step allows the first virtual machine manager to enable the shadowing function when it is determined that an instruction for enabling the shadowing function causes a call from the second virtual machine manager.

The Xeon CPU can be used for virtualization without relying on types of the second virtual machine manager and degrading the throughput due to an access to the register from the operating system.

BRIEF DESCRIPTION OF THE DRAWINGS

FIG. 3 is an explanatory diagram exemplifying memory areas according to the first embodiment of the invention;

FIG. 4 is an explanatory diagram exemplifying a register emulation policy table according to the first embodiment of the invention;

FIG. 5A is an explanatory diagram exemplifying a guest state area of Lv0 VMCS according to the first embodiment of the invention;

FIG. 5B is an explanatory diagram exemplifying a guest state area of Lv1 VMCS according to the first embodiment of the invention;

FIG. 6A is an explanatory diagram exemplifying a shadowing setting of Lv0 VMCS according to the first embodiment of the invention;

FIG. 6B is an explanatory diagram exemplifying a shadowing setting of Lv1 VMCS according to the first embodiment of the invention;

FIG. 7A is an explanatory diagram exemplifying an intercept setting of Lv0 VMCS according to the first embodiment of the invention;

FIG. 7B is an explanatory diagram exemplifying an intercept setting of Lv1 VMCS according to the first embodiment of the invention;

FIG. 8 is a flowchart showing processes performed by the hypervisor according to the first embodiment of the invention;

FIG. 9 is flowchart showing details of a logical VM exit process according to the first embodiment of the invention;

FIG. 10 is flowchart showing details of a logical VM entry process according to the first embodiment of the invention;

FIG. 11 is a flowchart showing an update process performed on CR0 or CR4 by the hypervisor according to the first embodiment of the invention;

DETAILED DESCRIPTION OF THE PREFERRED EMBODIMENTS

Embodiments of the present invention will be described in further detail with reference to the accompanying drawings.

First Embodiment

Figure 1:
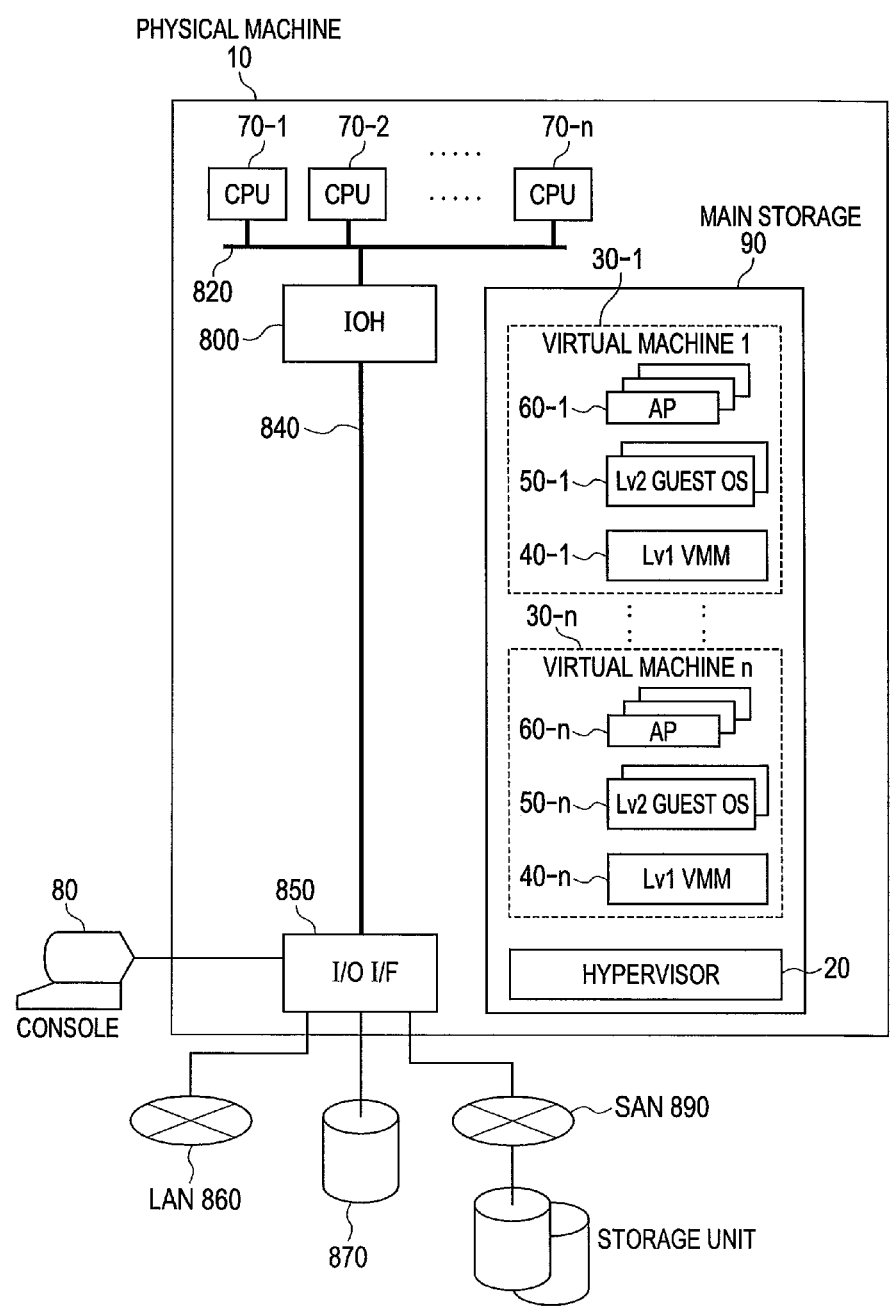
FIG. 1 is a block diagram showing a configuration example of the virtual machine system according to a first embodiment of the invention.

FIG. 1 is a block diagram showing a configuration example of the virtual machine system according to a first embodiment of the invention.

A physical machine 10 includes two or more CPUs 70-1 through 70-$n$ (or two or more sockets) compatible with x86 (or IA-32) corresponding to VT-x as the virtualization support function. The CPUs 70-1 through 70-$n$ connect with an IOH (I/O Hub) 800 and a main storage 90 via QPI (QUICK Path InterConnect) 820. Unless otherwise specified, the CPUs 70-1 through 70-$n$ are generically depicted as the CPU 70 in the following description.

The IOH 800 connects with an I/O interface (I/O I/F) 850 via a bus 840. The I/O interface 850 includes a network adapter connected to a LAN 860, a SCSI adapter connected to a disk unit 870 or equivalents, and a fiber channel adapter connected to SAN 890 (Storage Area Network).

The CPU 70 accesses the main storage 90 via the QPI 820 and accesses the I/O interface 850 via the IOH 800 to perform a specified process.

According to the example in FIG. 1, the physical machine 10 includes only one I/O interface 850. Two or more I/O interfaces may be available.

The I/O interface 850 is also connected to a console 80 for displaying images. The console 80 includes a graphic controller and is used for input and output operations for an operator.

The main storage 90 is equivalent to memory, for example, and stores a program performed by the CPU 70 and information needed to perform the program. The main storage 90 is also depicted as the memory 90 in the following description.

A hypervisor 20 is read into the memory 90. The hypervisor 20 implements virtual machines 30-1 through 30-$n$ where Lv2 guest OS's 50-1 through 50-$n$ are executed. The Lv2 guest OS's 50-1 through 50-$n$ perform APs (Applications) 60-1 through 60-$n$ on the virtual machines 30-1 through 30-$n$. The allocation of areas in the memory 90 will be described later with reference to FIG. 3.

The virtual machines 30-1 through 30-$n$ are configured as follow. The hypervisor 20 converts a physical machine resource provided for the physical machine into a virtual machine resource. The virtual machine resource is allocated to the virtual machine 30-1 through 30-$n$. A known technology may be appropriately used to allocate the machine resource of the physical machine 10 to the virtual machines 30-1 through 30-$n$ and is not described in detail.

The virtual machines 30-1 through 30-n each operate as an independent machine.

The virtual machines 30-1 through 30-n respectively operate Lv1 VMMs 40-1 through 40-n as the virtualization software that manages guest OS's and applications. According to the example in FIG. 1, the Lv1 VMM 40-1 manages the Lv2 guest OS 50-1. The Lv1 VMM 40-n manages the Lv2 guest OS 50-n. The Lv2 guest OS's 50-1 through 50-n perform APs 60-1 through 60-n, respectively.

The multiple virtual machines 30 operate on the physical machine 10 according to the embodiment. The Lv2 guest OS's 50-1 through 50-n operate on the virtual machines 30-1 through 30-n. The APs 60-1 through 60-n are performed on the Lv2 guest OS's 50-1 through 50-n.

A program for implementing the hypervisor 20 is stored in a disk device 870 or an equivalent storage device as a storage medium. When the physical machine 10 starts, the program is read into the memory 90 and is performed by the CPU 70.

Unless otherwise specified, the virtual machines 30-1 through 30-n are generically depicted as the virtual machine 30 in the following description. Unless otherwise specified, the Lv1 VMMs 40-1 through 40-n are generically depicted as the Lv1 VMM 40. Unless otherwise specified, the Lv2 guest OS's 50-1 through 50-n are generically depicted as the Lv2 guest OS 50.

Figure 2:
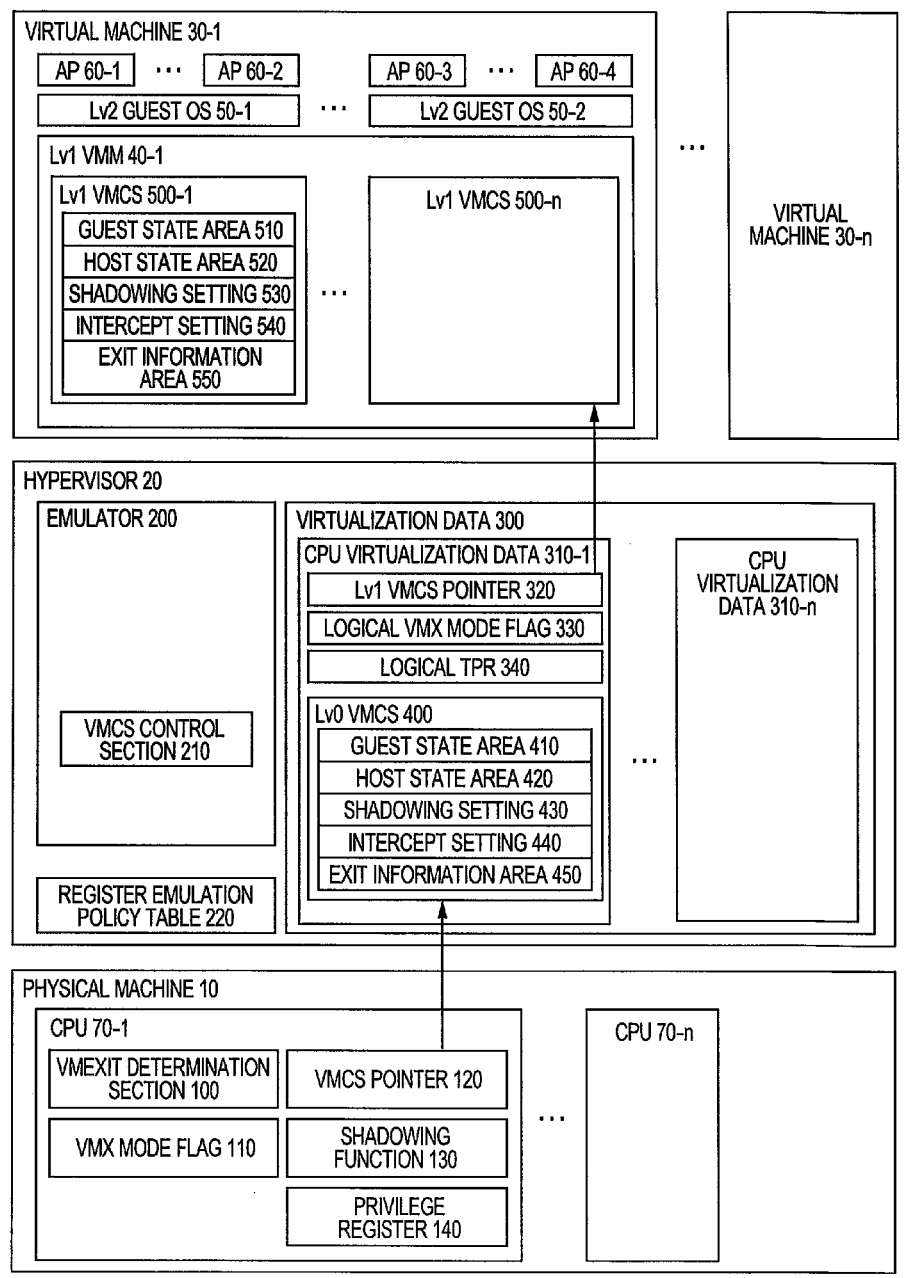
FIG. 2 is a stack diagram showing major software and hardware components of the virtual machine system according to the first embodiment of the invention.

FIG. 2 is a stack diagram showing major software and hardware components of the virtual machine system according to the first embodiment of the invention.

The hypervisor 20 operates on the physical machine 10 and manages the multiple virtual machines 30. The Lv1 VMM 40 operates on each virtual machine 30 using the virtual machine resource supplied from the hypervisor 20. One or more Lv2 guest OS's 50 operate on the Lv1 VMM 40.

The CPU having the VT-x feature includes a VMX mode in addition to the normal operation mode. The VMX mode provides the virtualization support function. The VMX mode includes two operation modes, VMX non-root mode and VMX root mode.

The VMX non-root allows operations of the Lv1 VMM 40, the Lv2 guest OS 50, or the AP 60. The VMX root allows operations of the hypervisor 20.

There are two schemes of transition between the two operation modes. One is "VM entry" that enables transition from the VMX root mode to the VMX non-root mode. The other is "VM exit" that enables transition from the VMX non-root mode to the VMX root mode.

The hypervisor 20 using the VT-x feature stores data called VMCS (Virtual Machine Control Structure). The data supplies information for controlling the CPU 70 and states of each virtual machine 30, that is, information about control over the CPU 70 in the VMX non-root mode and about the transition between the VMX modes.

According to the example in FIG. 2, CPU virtualization data 310-1 through 310-n are equivalent to the VMCS stored in the hypervisor 20. The detail will be described later. Similarly, the Lv1 VMM 40 stores Lv1 VMCS's 500-1 through 500-n. This VMCS supplies information for controlling the Lv2 guest OS 50 and the virtual CPU (i.e., virtual machine 30) allocated by the hypervisor 20.

The following describes an example of the transition from the VMX root mode to the VMX non-root mode (VM entry).

To change the normal operation mode of the CPU 70 to the VMX mode, the hypervisor 20 issues a VMXON instruction.

After entering the VMX mode, the hypervisor 20 writes information for executing the operating system 50 or the AP 60 to Lv0 VMCS 400. The hypervisor 20 then issues a VM entry instruction (VMLAUNCH or VMRESUME) to change from the VMX root mode to the VMX non-root mode (VM entry).

The following describes an example of the transition from the VMX non-root mode to the VMX root mode (VM exit).

The CPU 70 notifies the hypervisor 20 of the VM exit in a specified case where the Lv2 guest OS 50 issues a privilege instruction, for example.

When detecting the VM exit, the hypervisor 20 performs a specified emulation to complete a process on the Lv2 guest OS 50, for example. The hypervisor 20 then rewrites the Lv1 VMCS 500 as needed and issues a VM entry instruction to change from the VMX non-root mode to the VMX root mode.

According to the embodiment, the operation mode transition is also available between the Lv1 VMM 40 and the Lv2 guest OS 50 or the AP 60. In the following description, the operation mode transition from the Lv1 VMM 40 to the Lv2 guest OS 50 or the AP 60 is referred to as a logical VM entry. The operation mode transition from the Lv2 guest OS 50 or the AP 60 to the Lv1 VMM 40 is referred to as a logical VM exit.

On the occurrence of a logical VM entry according to the embodiment, the hypervisor 20 reads the contents of the Lv1 VMCS 500 (guest state area 510 and host state area 520) and stores the contents in a guest state area 410 of the Lv0 VMCS 400. In this manner, the virtual machine 30 provides the Lv2 guest OS 50 with the VT-x feature.

The following describes in detail the hardware and software configurations in the CPU 70 having the VT-x feature.

The CPU 70 having the VT-x feature includes a VMEXIT determination section 100, a VMX mode flag 110, a VMCS pointer 120, a shadowing function 130, and a privilege register 140.

While the virtual machine 30 operates, the VMEXIT determination section 100 verifies an operation of the Lv2 guest OS 50 to determine whether the hypervisor 20 is called. That is, the VMEXIT determination section 100 determines whether a VM exit occurs.

The VMX mode flag 110 determines whether an active instruction is issued from the hypervisor 20 or the virtual machine 30. Specifically, the VMX mode flag 110 stores a value indicating "VMX root" when the instruction is issued from the hypervisor 20. The VMX mode flag 110 stores a value indicating "VMX non-root" when the instruction is issued from the virtual machine 30.

The VMCS pointer 120 stores a memory address of the CPU virtualization data 310 to be stored by the hypervisor 20.

When the virtual machine 30 issues an instruction for referencing the privilege register, the shadowing function 130 allows the CPU 70 to read data stored in the memory 90 instead of a value stored in the privilege register 140 for the response to the instruction. The shadowing function 130 enables manipulation of the privilege register 140 without activating the hypervisor 20, making it possible to prevent the throughput from degrading.

While the shadowing function 130 is provided for the hypervisor 20, the embodiment can also provide the function for the virtual machine 30 according to the method to be described later. The Lv2 guest OS 50 or the AP 60 uses the shadowing function to manipulate the privilege register 140 without needing to execute the Lv1 VMM 40 and the hypervisor 20, making it possible to prevent the throughput from degrading.

The CPU 70 maintains the privilege register 140 that contains control register 0 (CR0), control register 4 (CR4), and a task priority register (TPR). The CPU 70 also maintains the other registers, though not shown.

CR0 and CR4 each are a set of 1-bit registers (flags) that stores control information for the CPU 70. The control information contains PG, NE, PE, VMXE, and SMXE.

The TPR stores priorities of instruction execution. The TPR is used to determine whether an interrupt from outside or the currently processed instruction should take precedence.

According to the embodiment, the shadowing function 130 is used to manipulate CR0, CR4, and the TPR. The detail will be described later.

The hypervisor 20 includes an emulator 200, a register emulation policy table 220, and virtualization data 300.

The emulator 200 emulates the virtual machines 30. The emulator 200 includes a VMCS control section 210 for changing settings of the Lv0 VMCS 400 in accordance with states of the virtual machine 30. The VMCS control section 210 manages correspondence relation between the Lv0 VMCS 400 and the Lv1 VMCS 500.

The register emulation policy table 220 stores an emulation policy indicating which emulation should be performed for the privilege register or for each flag of the privilege register. The detail will be described later with reference to FIG. 4.

The virtualization data 300 stores the state of the virtual machine 30. The virtualization data 300 contains CPU virtualization data 310 that maintains the state of the CPU 70.

The CPU virtualization data 310 contains a VMCS for controlling the VT-x provided for the CPU 70. One piece of CPU virtualization data 310 is stored for each virtual machine 30. The CPU virtualization data 310 contains an Lv1 VMCS pointer 320, a logical VMX mode flag 330, a logical TPR 340, and an Lv0 VMCS 400.

The Lv1 VMCS pointer 320 stores an address in the memory 90 that stores the Lv1 VMCS 500 for the virtual machine 30. The address in the memory 90 provides an address value for uniquely identifying the memory 90 in the address scheme (address space for the physical machine).

The logical VMX mode flag 330 is equivalent to the VMX mode flag 110 especially for the virtual machine 30. The logical VMX mode flag 330 stores a value indicating the "VMX root mode" or the "VMX non-root mode" as the operation mode of the virtual CPU allocated to the virtual machine 30.

The logical TPR 340 is especially used for the virtual machine 30.

The Lv0 VMCS 400 stores states of the virtual machines 30, states of the hypervisor 20, and information for controlling the CPU 70. The Lv0 VMCS 400 includes a guest state area 410, a host state area 420, a shadowing setting 430, an intercept setting 440, and an Exit information area 450.

The guest state area 410 stores states of a virtual CPU (not shown) allocated to the virtual machine 30. That is, the guest state area 410 stores status such as register states of the privilege registers CR0 and CR4 maintained by the virtual CPU allocated to the virtual machine 30.

When a VM entry occurs, for example, the CPU 70 writes the contents of the guest state area 410 to the privilege register 140. This makes it possible to run the virtual machine 30. When a VM exit occurs, the CPU 70 stores a value of the privilege register 140 of its own in the guest state area 410. This makes it possible to maintain information needed to rerun the virtual machine 30.

The detail of the guest state area 410 will be described later with reference to FIG. 5A.

The host state area 420 stores status such as register states of the CPU 70 for the hypervisor 20 to run. When a VM exit occurs, for example, the CPU 70 writes the contents of the host state area 420 to the privilege register 140. This makes it possible to run the hypervisor 20. When a VM entry occurs, the CPU 70 stores a value of the privilege register 140 of its own in the host state area 420. This makes it possible to maintain information needed to rerun the hypervisor 20.

The shadowing setting 430 stores information for controlling the shadowing function. Specifically, the shadowing setting 430 stores: information indicating whether or not to enable the shadowing function for manipulating the privilege register 140; and information about shadow data to be read when the shadowing function is enabled. The detail of the shadowing setting 430 will be described later with reference to FIG. 6A.

The intercept setting 440 stores a condition for a VM exit to occur. For example, the intercept setting 440 stores information indicating whether a VM exit occurs when an attempt is made to manipulate a specified privilege register. The detail of the intercept setting 440 will be described later with reference to FIG. 7A.

The Exit information area 450 stores detailed information about the cause of the VM exit.

The virtual machine 30 includes an Lv1 VMM 40, an Lv2 guest OS 50, and an AP 60.

The Lv1 VMM 40 controls multiple Lv2 guest OS's 50. The Lv1 VMM 40 contains an Lv1 VMCS 500 for implementing VT-x on the virtual machine 30. The Lv1 VMCS 500 uses the same data structure as that of the Lv0 VMCS 400 and contains a guest state area 510, a host state area 520, shadowing setting 530, intercept setting 540, and an Exit information area 550.

The guest state area 510 is equivalent to the guest state area 410. The host state area 520 is equivalent to the host state area 420. The shadowing setting 530 is equivalent to the shadowing setting 430. The intercept setting 540 is equivalent to the intercept setting 440. The Exit information area 550 is equivalent to the Exit information area 450. A detailed description is omitted for simplicity.

The Lv2 guest OS (Operating System) 50 runs on the Lv1 VMM 40. The AP (application) 60 runs on the Lv2 guest OS 50. There may be multiple Lv2 guest OS's 50 and APs 60.

FIG. 3 is an explanatory diagram exemplifying storage areas in the memory 90 according to the first embodiment of the invention.

The hypervisor 20 manages allocation of the memory 90. The hypervisor 20 allocates two types of areas to the memory 90. One area is used for the hypervisor 20 itself. The other area is used for the virtual machine 30. As shown in FIG. 3, for example, the hypervisor 20 allocates addresses AD0 and AD1 to itself, addresses AD1 and AD2 to the virtual machine 30-1, and addresses AD3 and AD4 to the virtual machine 30-n.

The address area allocated to the hypervisor 20 itself is used for the emulator 200, the virtualization data 300, and the register emulation policy table 220.

The address area allocated to the virtual machine 30 is used for the Lv1 VMM 40 and the Lv2 guest OS 50. The virtual machine 30 assumes the address areas allocated by the hypervisor 20 to be those provided for the virtual machine 30.

FIG. 4 is an explanatory diagram exemplifying the register emulation policy table 220 according to the first embodiment of the invention.

The register emulation policy table 220 defines emulation policies used for the virtual machine 30 to manipulate the privilege register 140. The register emulation policy table 220 contains a register name 605, an emulation policy 610, and a hypervisor-specific value 615.

The register name 605 stores names of the privilege registers 140 or their flags.

The emulation policy 610 stores emulation policies for registers corresponding to the register name 605. The emulation policies include "through", "intercept", and "shadowing".

The "through" policy allows the virtual machine 30 to directly manipulate the privilege register 140. The "intercept" policy allows the hypervisor 20 to perform emulation when the virtual machine 30 manipulates the privilege register 140. The "shadowing" policy uses the shadowing function 130 provided for the CPU 70 when the virtual machine 30 manipulates the privilege register 140. The emulation policy makes it possible to return and update data in the memory 90 without running the hypervisor 20.

The hypervisor 20 maintains the hypervisor-specific value 615 for a register (flag) whose emulation policy 610 indicates "intercept" or "shadowing". The hypervisor-specific value 615 is placed in the guest state area 410 of the Lv0 VMCS 400.

Settings of the privilege register 140 in the VMX mode will be described.

The VMX mode limits operations of the CPU 70. Accordingly, given flags of the privilege registers CR0 and CR4 are fixed to specified values. Specifically, flags CR0.PE, CR0.NE, CR0.PG, and CR4.VMXE are fixed to "1". The VMXON instruction fails when these flags are set to an undefined value.

The TPR need not be fixed to a specific value. However, it is preferable to fix the TPR to "0" because the hypervisor 20 or the Lv1 VMM 40 may not be able to detect an interrupt.

The register emulation policy table 220 is not limited to the form as shown in FIG. 4. The register emulation policy table 220 may be stored in any form that can effectively represent the correspondence relation among the privilege register 140, the emulation policy 610, and the hypervisor-specific value 615.

FIG. 5A is an explanatory diagram exemplifying the guest state area 410 of the Lv0 VMCS 400 according to the first embodiment of the invention. FIG. 5B is an explanatory diagram exemplifying the guest state area 510 of the Lv1 VMCS 500 according to the first embodiment of the invention.

The guest state area 410 stores values of the privilege register 140 needed to execute an instruction of the virtual machine 30. The guest state area 410 contains a flag name 620 and a guest-operation register value 625.

The flag name 620 stores the name of a register corresponding to each flag of the privilege register 140. The guest-operation register value 625 stores a value placed in the CPU 70 when the virtual machine 30 operates.

The guest state area 510 stores values of the privilege register 140 needed to execute an instruction of the Lv2 guest OS 50. The guest state area 510 contains a flag name 630 and a guest-operation register value 635. The flag name 630 is equivalent to the flag name 620. The guest-operation register value 635 is equivalent to the guest-operation register value 625.

Values stored in the guest state area 410 need not equal those stored in the guest state area 510.

FIG. 6A is an explanatory diagram exemplifying the shadowing setting 430 of the Lv0 VMCS 400 according to the first embodiment of the invention. FIG. 6B is an explanatory diagram exemplifying the shadowing setting 530 of the Lv1 VMCS 500 according to the first embodiment of the invention.

The shadowing setting 430 stores shadowing function settings when the virtual machine 30 manipulates the privilege register 140. The shadowing setting 430 contains a shadowing function setting table 4301 and shadow data setting tables 4302 and 4303.

The shadowing function setting table 4301 determines whether to enable the shadowing function. The shadowing function setting table 4301 contains a shadowing target name 640 and a shadowing enable flag 645.

The shadowing target name 640 stores names of the privilege register 140 or names of the registers corresponding to the flags of the privilege register 140. Specifically, the shadowing target name 640 stores names of the registers corresponding to the flags of the registers CR0 and CR4. The shadowing target name 640 stores the name of the TPR itself.

The shadowing enable flag 645 stores information indicating whether to enable the shadowing function for the register corresponding to the shadowing target name 640. Specifically, setting the shadowing enable flag 645 to "1" enables the shadowing function. Setting the shadowing enable flag 645 to "0" disables the shadowing function.

The shadow data setting table 4302 stores shadow data to be read only when the shadowing function is enabled for the registers CR0 and CR4 of the privilege register 140.

When the virtual machine 30 manipulates the privilege register 140, shadow data is read or written in place of values stored in the privilege register 140. The shadow data is stored in the memory 90.

The shadow data setting table 4302 contains a shadow data name 650 and shadow data 655.

The shadow data name 650 represents names of shadow data corresponding to the flags of CR0 and CR4 for which the shadowing function is enabled.

The shadow data 655 is read when the shadowing enable flag 645 is enabled.

When CR0 is to be read, for example, the shadowing enable flag 645 is verified first. When the flag enables the shadowing function, the shadow data 655 corresponding to the flag is read. When the flag disables the shadowing function, the value corresponding to the flag is read from CR0. These read values are merged into a single value of CR0 to be read.

The shadow data setting table 4303 stores shadow data to be read when the shadowing function is enabled for the TPR of the privilege register 140. The shadow data setting table 4303 contains a shadow data name 660 and a shadow data address 665.

The shadow data name 660 indicates the name of shadow data corresponding to the TPR for which the shadowing function is enabled.

The shadow data address 665 stores the pointer to an address of the memory 90 for storing data to be read when the shadowing enable flag 645 is enabled.

When the shadowing function is enabled for the TPR, for example, access to an address stored in the shadow data address 665 reads shadow data stored at that address from the memory 90.

The following describes how a guest manipulates the privilege register 140. For example, the guest signifies the Lv1 VMM 40 viewed from the hypervisor 20 or the Lv2 guest OS 50 or the AP 60 viewed from the Lv1 VMM 40.

When the shadowing enable flag 645 is set to "0", the guest reads the privilege register 140 itself and directly writes to it.

When the shadowing enable flag 645 is set to "1", the guest reads the shadow data 655 for the corresponding flag. The guest may issue an instruction for writing a value different from the shadow data 655. In such a case, a VM exit occurs.

The shadowing setting 530 stores shadowing function settings when the Lv2 guest OS 50 or the AP 60 manipulates the privilege register 140. The shadowing setting 530 contains a shadowing function setting table 5301 and shadow data setting tables 5302 and 5303 to be read when the shadowing function is enabled.

The shadowing function setting table 5301, and the shadow data setting tables 5302 and 5303 are equivalent to the shadowing function setting table 4301, and the shadow data setting tables 4302 and 4303, respectively. The shadow data address 665 stores a memory address of the virtual machine 30. The memory address of the virtual machine 30 provides an address value for uniquely identifying the memory (see FIG. 3) allocated to the virtual machine 30 in the address scheme (address space for the virtual machine).

Data stored in the shadowing setting 430 need not equal data stored in the shadowing setting 530.

FIG. 7A is an explanatory diagram exemplifying the intercept setting 440 of the Lv0 VMCS 400 according to the first embodiment of the invention. FIG. 7B is an explanatory diagram exemplifying the intercept setting 540 of the Lv1 VMCS 500 according to the first embodiment of the invention.

The intercept setting 440 defines causes of a VM exit for calling the hypervisor 20 corresponding to operations of the virtual machine 30. The intercept setting 440 contains an intercept target name 700 and an intercept enable flag 705.

The intercept target name 700 stores names of instructions that cause the VM exit.

The intercept enable flag 705 stores values indicating occurrence of the VM exit. When the intercept enable flag 705 stores "0", no VM exit occurs. When the intercept enable flag 705 stores "1", the VM exit occurs.

CR8 is an alias of the TPR. The entry "CR8-store exiting" of the intercept target name 700 determines occurrence of the VM exit when the TPR is referenced (read). The entry "CR8-load exiting" of the intercept target name 700 determines occurrence of the VM exit when the TPR is updated (written).

The intercept setting 540 defines causes of a logical VM exit for calling the Lv1 VMM 40 corresponding to operations of the Lv2 guest OS 50 or the AP 60. The intercept setting 540 contains an intercept target name 710 and an intercept enable flag 715.

The intercept target name 710 is equivalent to the intercept target name 700. The intercept enable flag 715 is equivalent to the intercept enable flag 705.

Data stored in the intercept setting 440 need not equal data stored in the intercept setting 540.

The following describes how the virtual machine 30 manipulates the privilege register 140 in the VMX non-root mode.

In terms of read operations on CR0 or CR4, the virtual machine 30 reads shadow data corresponding to the flag set to "1" of the shadowing enable flag 645. The virtual machine 30 reads the flag itself of CR0 or CR4 when the flag of the shadowing enable flag 645 is set to "0". The virtual machine 30 reads CR0 or CR4 itself when all flags for CR0 or CR4 of the shadowing enable flag 645 are set to "0s".

In terms of read operations on the TPR, the virtual machine 30 reads the TPR itself when "CR8-store exiting" of the intercept setting 440 is set to "0" and "UseTprShadow" of the shadowing function setting table 4301 is set to "0".

The virtual machine 30 reads the address stored in the shadow data address 665 for "Virtual Apic Page" of the shadow data setting table 4303 when "CR8-store exiting" of the intercept setting 440 is set to "0" and "UseTprShadow" of the shadowing function setting table 4301 is set to "1".

A VM exit occurs regardless of the value for "UseTprShadow" of the shadowing function setting table 4301 when "CR8-store exiting" of the intercept setting 440 is set to "1".

When no VM exit occurs, the virtual machine 30 does not write to CR0 for which the shadowing enable flag 645 is set to "1" to enable the shadowing function.

The virtual machine 30 writes to the other flags in accordance with settings of "unrestricted guest" in a VM execution area (not shown) of the Lv0 VMCS 400. Examples are described below.

When "unrestricted guest" is set to "0", setting any flag in CR0 to an inapplicable value in the VMX mode causes "general-protection exception".

When "unrestricted guest" is set to "1", setting any flag other than that at bit 0 (PE) or bit 31 (PG) in CR0 to an inapplicable value in the VMX mode causes "general-protection exception". Under the condition of CR0.PE=0 and CR0.PG=1, or CR0.PG=1, CR4.PAE=0 and IA32_EFER.LME=0, the state of causing "general-protection exception" remains during execution of writing.

When no VM exit occurs, the virtual machine 30 does not write to CR4 for which the shadowing enable flag 645 is set to "1" to enable the shadowing function. Setting any flag in CR0 to an inapplicable value in the VMX mode causes "general-protection exception".

In terms of write operations on the TPR, the virtual machine 30 normally writes to the TPR when "CR8-load exiting" of the intercept setting 440 is set to "0" and "UseTprShadow" of the shadowing function setting table 4301 is set to "0". The virtual machine 30 writes to the shadow data address 665 when "CR8-store exiting" of the intercept setting 440 is set to "0" and "UseTprShadow" of the shadowing function setting table 4301 is set to "1". A VM exit occurs regardless of the value for "UseTprShadow" of the shadowing function setting table 4301 when "CR8-load exiting" of the intercept setting 440 is set to "1".

The following describes an example of processing executed by the CPU 70 in association with the register manipulation.

FIG. 8 is a flowchart showing processes performed by the hypervisor 20 according to the first embodiment of the invention.

The hypervisor 20 performs an initialization process (S1200). For example, the hypervisor 20 configures the virtualization data 300 in accordance with specifications of the virtual machine 30 to be created and generates an initial state of the virtual machine 30.

The hypervisor 20 issues a VM entry instruction (VMLAUNCH instruction) for changing the operation mode of the CPU 70 to the VMX non-root mode and performs an instruction from the guest such as the virtual machine 30, the Lv2 guest OS 50, or the AP 60 (S1280).

The CPU 70 executes a guest instruction until a VM exit occurs, that is, an event (instruction) defined for the intercept setting 440 or 540 occurs (S1290). The guest instruction is to be performed by the Lv2 guest OS 50 or the AP 60.

The process at step S1290 will be described later in detail with reference to FIG. 14.

When the VM exit occurs, the hypervisor 20 restarts the process and analyzes the cause of the VM exit by performing the following determination.

The hypervisor 20 determines whether the VM exit occurred due to a VM exit (logical VM exit) instruction issued to the Lv1 VMM 40 (S1210). That is, the hypervisor 20 determines whether the Lv1 VMM 40 performs a process.

To do this, the hypervisor 20 references the exit reason stored in the Exit information area 450 of the Lv0 VMCS 400 the intercept setting 540 of the Lv1 VMCS 500. The hypervisor 20 then determines whether the Lv1 VMM 40 satisfies the specified VM exit condition. When it is determined that the Lv1 VMM 40 satisfies the specified VM exit condition the VM exit is assumed to occur because the VM exit (logical VM exit) instruction was issued to the Lv1 VMM 40.

When it is determined that the VM exit occurred due to the VM exit (logical VM exit) instruction issued to the Lv1 VMM 40, the hypervisor 20 performs a logical VM exit process to prepare execution of the Lv1 VMM 40 (S1220). The logical VM exit process will be described later in detail with reference to FIG. 9.

When it is determined that the VM exit occurred not due to the VM exit (logical VM exit) instruction issued to the Lv1 VMM 40, the hypervisor 20 determines whether the VM exit occurred due to update of CR0 or CR4 (S1230). The determination method is equivalent to that at step S1210.

When it is determined that the VM exit occurred due to update of CR0 or CR4, the hypervisor 20 performs an update process on CR0 or CR4 in the virtual machine 30 (S1240). The update process on CR0 or CR4 in the virtual machine 30 will be described later in detail with reference to FIG. 13.

When it is determined that the VM exit occurred not due to update of CR0 or CR4, the hypervisor 20 the hypervisor 20 determines whether the VM exit occurred due to a VM entry (logical VM entry) instruction issued to the Lv1 VMM 40 (S1250). To do this, the hypervisor 20 determines whether the Lv1 VMM 40 is operating and the VM exit occurred due to the VM entry. When both conditions are satisfied, it is determined that the VM exit occurred due to the VM entry (logical VM entry) instruction issued to the Lv1 VMM 40.

When it is determined that the VM exit occurred due to the VM entry (logical VM entry) instruction issued to the Lv1 VMM 40, the hypervisor 20 performs a logical VM entry process to prepare execution of the Lv2 guest OS 50 (S1260). The logical VM entry process will be described later in detail with reference to FIG. 10.

When it is determined that the VM exit occurred not due to the VM entry (logical VM entry) instruction issued to the Lv1 VMM 40, the hypervisor 20 performs emulation corresponding to the reason for the VM exit (S1270).

The hypervisor 20 then returns to step S1280 and performs the same process.

FIG. 9 is flowchart showing details of the logical VM exit process according to the first embodiment of the invention. FIG. 9 describes the detail of the process at step S1220 in FIG. 9.

The logical VM exit process implements a logical VM exit. The logical VM exit allows the virtual machine 30 to change the operation mode from the "VMX non-root mode" for operating the Lv2 guest OS 50 to the "VMX root mode" for operating the Lv1 VMM 40.

The hypervisor 20 reads the guest state area 410 except Guest Cr for the Lv0 VMCS 400. The hypervisor 20 reflects the read guest state area 410 for the Lv0 VMCS 400 on the guest state area 510 for the Lv1 VMCS 500 (S1300).

Specifically, the hypervisor 20 copies the guest state area 410 for the Lv0 VMCS 400 to the guest state area 510 for the Lv1 VMCS 500.

At steps S1310 through S1355, the hypervisor 20 updates CR0 and CR4 in the guest state area 510 for the Lv1 VMCS 500. This process is performed for the following reason.

The guest state area 510 of the Lv1 VMCS 500 needs to store a value of the privilege register the virtual machine 30 maintains. When the shadowing function is disabled for the Lv1 VMM 40, CR0 and CR4 for the virtual machine 30 may vary with an operation of the Lv2 guest OS 50. It is necessary to specify a value of the privilege register originally maintained by the virtual machine 30 and reflect the specified privilege register value on the guest state area 510 for the Lv1 VMCS 500. Accordingly, the hypervisor 20 performs the following process from steps S1310 to S1355.

The hypervisor 20 references the shadowing function setting table 5301 of the shadowing setting 530 for the Lv1 VMCS 500. The hypervisor 20 selects a flag for CR0 or CR4 to be processed from the table and repeats the process for the selected flag (S1310).

The hypervisor 20 determines whether the shadowing enable flag 675 for the selected flag is set to "1" (S1320). That is, the hypervisor 20 determines whether the shadowing function is enabled for the selected flag.

When the shadowing function is enabled for the Lv1 VMM 40 with respect to CR0 or CR4, the Lv2 guest OS 50 may update or write to the privilege register CR0 or CR4 in the guest state area 510. In such a case, a logical VM exit occurs. Accordingly, the privilege register CR0 or CR4 in the guest state area 510 is not updated while the Lv2 guest OS 50 is running.

When it is determined that the shadowing enable flag for the selected flag is set to "1", the hypervisor 20 references the shadowing function setting table 5310, selects the next entry to be processed, and performs the process at step S1320. When the processes are complete on all flags in the shadowing function setting table 5301 (S1355), the hypervisor 20 proceeds to step S1360.

When it is determined that the shadowing enable flag for the selected flag is set to "0", the hypervisor 20 references the register emulation policy table 220 and determines whether the emulation policy 610 for the selected flag is "shadowing" (S1330).

When it is determined that the emulation policy 610 for the selected flag is not "shadowing", the hypervisor 20 references the guest state area 410 for the Lv0 VMCS 400 and reads the guest-operation register value 625 for the selected flag. The hypervisor 20 updates the flag value in the guest state area 510 for the Lv1 VMCS 500 based on the read guest-operation register value 625 (S1340).

This is because the update to CR0 or CR4 is directly reflected on the guest state area 410 for storing the privilege register 140 while the Lv2 guest OS 50 is running.

When it is determined that the emulation policy 610 for the selected flag is "shadowing", the hypervisor 20 references shadowing setting 430 and reads the shadow data 655 for the selected flag. The hypervisor 20 updates the flag value in the guest state area 510 for the Lv1 VMCS 500 based on the read shadow data 655 (S1350).

This is because the update to CR0 or CR4 is reflected on the shadowing setting 430 of the Lv0 VMCS 400 for storing the shadow data while the Lv2 guest OS 50 is running.

After step S1340 or S1350, the hypervisor 20 references the shadowing function setting table 5301, selects the next entry to be processed, and performs the process at step S1320. When the processes are complete on all flags in the shadowing function setting table 5310 (S1355), the hypervisor 20 proceeds to step S1360.

The hypervisor 20 reads the Exit information area 450 of the Lv0 VMCS 400. The hypervisor 20 updates the Exit information area 550 of the Lv1 VMCS 500 based on the read Exit information area (S1360). This process reflects the cause of the VM exit received by the CPU 70 on the Lv1 VMCS 500.

The hypervisor 20 reads the host state area 520 of the Lv1 VMCS 500. The hypervisor 20 updates the guest state area 410 of the Lv0 VMCS 400 based on the read host state area 520 (S1370). This process enables the CPU 70 to read settings for running the Lv1 VMM 40.

The hypervisor 20 changes the logical VMX mode flag 330 to VMX root (S1380) and terminates the process. The above-mentioned process completes the preparation needed for running the Lv1 VMM 40.

FIG. 10 is flowchart showing details of the logical VM entry process according to the first embodiment of the invention. FIG. 10 describes the detail of the process at step S1260 in FIG. 8.

The hypervisor 20 reads the intercept setting 540 of the Lv1 VMCS 500. The hypervisor 20 updates the intercept setting 440 of the Lv0 VMCS 400 based on the read intercept setting 540 of the Lv1 VMCS 500 (S1400).

Specifically, the hypervisor 20 updates the intercept setting 440 of the Lv0 VMCS 400 so as to include the intercept condition defined in the intercept setting 540 of the Lv1 VMCS 500. When the intercept condition defined in the intercept setting 540 is satisfied, the intercept setting 440 of the Lv0 VMCS 400 is updated so as to interrupt execution of the Lv2 guest OS 50 and read the hypervisor 20.

The hypervisor 20 reads the guest state area 510 of the Lv1 VMCS 500. The hypervisor 20 updates the guest state area 410 of the Lv0 VMCS 400 based on the read guest state area 510 (S1410). That is, the hypervisor 20 reflects the setting for the guest state area 510 of the Lv1 VMCS 500 on the guest state area 410 of the Lv0 VMCS 400 so that the CPU 70 can read the setting for the Lv2 guest OS 50.

The hypervisor 20 reads the shadowing setting 530 of the Lv1 VMCS 500. The hypervisor 20 updates the shadowing setting 430 of the Lv0 VMCS 400 based on the read shadowing setting 530 (S1420 and S1430).

The update process (S1420) for CR0 and CR4 of the shadowing setting 430 will be described later in detail with reference to FIG. 11. The update process (S1430) for the TPR of the shadowing setting 430 will be described later in detail with reference to FIG. 12.

The hypervisor 20 changes the logical VMX mode flag 330 to VMX non-root (S1440) and terminates the process. The above-mentioned process completes the preparation needed for running the Lv2 guest OS 50.

FIG. 11 is a flowchart showing an update process performed on CR0 or CR4 by the hypervisor 20 according to the first embodiment of the invention.

The hypervisor 20 selects a target flag for CR0 or CR4 from the guest state area 510 for the Lv1 VMCS 500 and performs the following process on the selected flag (S1000).

The hypervisor 20 references the shadowing setting 530 of the Lv1 VMCS 500 and determines whether the shadowing function is enabled for the selected flag (S1005). That is, the hypervisor 20 determines whether the Lv1 VMM 40 uses the shadowing function for the selected flag.

Specifically, the hypervisor 20 references the shadowing function setting table 5301 and determines whether the shadowing enable flag 675 for the selected flag is set to "1".

When it is determined that the shadowing function is not enabled for the selected flag, the hypervisor 20 references the register emulation policy table 220 and determines whether the emulation policy 610 for the selected flag is "shadowing" (S1010). That is, the hypervisor 20 determines whether it enables the shadowing function for the selected flag.

When it is determined that the emulation policy 610 for the selected flag is not "shadowing", the hypervisor 20 references the shadowing setting 430 for the Lv0 VMCS 400 and disables the shadowing function for the selected flag (S1015).

Specifically, the hypervisor 20 references the shadowing function setting table 5301 and sets the shadowing enable flag 645 for the selected flag to "0".

The hypervisor 20 reads the value of the flag selected from the guest state area 510 for the Lv1 VMCS 500. The hypervisor 20 updates the guest state area 410 for the Lv0 VMCS 400 based on the read value (S1020) and then proceeds to step S1080.

When it is determined at step S1010 that the emulation policy 610 for the selected flag is "shadowing", the hypervisor 20 reads the guest state area 510 for the Lv1 VMCS 500. The hypervisor 20 updates the shadowing setting 430 for the Lv0 VMCS 400 based on the read guest state area 510 (S1025).

Specifically, the hypervisor 20 reads the guest-operation register value 635 for the selected flag from the guest state area 510 for the Lv1 VMCS 500. The hypervisor 20 allocates the read value to the shadow data 655 in the shadow data setting table 4302.

The hypervisor 20 then enables the shadowing function for the control bit corresponding to the selected flag in accordance with the shadowing setting 430 for the Lv0 VMCS 400 (S1030).

Specifically, the hypervisor 20 references the shadowing function setting table 4301 and allocates "1" to the shadowing enable flag 645 for the control bit corresponding to the selected flag.

The hypervisor 20 reads the hypervisor-specific value 615 for the selected flag from the register emulation policy table 220. The hypervisor 20 updates the guest state area for the Lv0 VMCS 400 based on the read hypervisor-specific value 615 (S1035) and proceeds to step S1080.

Specifically, the hypervisor 20 allocates the read hypervisor-specific value 615 to the guest-operation register value 625 for the selected flag.

When it is determined at step S1005 that the shadowing function is enabled for the selected flag, the hypervisor 20 reads the shadow data 685 for the selected flag from the shadowing setting 530 for the Lv1 VMCS 500 (S1040).

The hypervisor 20 then updates the shadowing setting 430 for the Lv0 VMCS 400 based on the read shadow data 685 (S1045). Specifically, the hypervisor 20 allocates the read shadow data to the shadow data 655 for the selected flag.

The hypervisor 20 updates the shadowing function for the selected flag in accordance with the shadowing setting 430 for the Lv0 VMCS 400 (S1050).

Specifically, the hypervisor 20 references the shadowing function setting table 4301 and sets the shadowing enable flag 645 for the selected flag to "1".

The hypervisor 20 references the register emulation policy table 220 and determines whether the emulation policy 610 for the flag with the shadowing function enabled at step S1050 is "shadowing" (S1060). That is, the hypervisor 20 uses the shadowing function to reflect the hypervisor-specific value 620 on CR0 and CR4 for the physical machine 10.

When it is determined that the emulation policy 610 of the selected flag is not "shadowing", the hypervisor 20 reads the guest-operation register value 635 for the selected flag from the guest state area 510 for the Lv1 VMCS 500. The hypervisor 20 updates the guest state area 410 for the Lv0 VMCS 400 based on the read guest-operation register value 635 (S1065) and proceeds to step S1080.

Specifically, the hypervisor 20 allocates the read guest-operation register value 635 to the guest-operation register value 625 of the selected flag.

The process at step S1065 allows the guest state area 410 for the Lv0 VMCS 400 to reflect the setting of the guest state area 510 for the Lv1 VMCS 500 during execution of the Lv2 guest OS 50.

When it is determined that the emulation policy 610 for the selected flag is "shadowing", the hypervisor 20 reads the hypervisor-specific value 615 for the selected flag from the register emulation policy table 220. The hypervisor 20 updates the guest state area 410 for the Lv0 VMCS 400 based on the read hypervisor-specific value 615 (S1070) and proceeds to step S1080.

Specifically, the hypervisor 20 allocates the read hypervisor-specific value 615 to the guest-operation register value 625 of the selected flag.

At step S1080, the hypervisor 20 determines whether all the flags have been processed. When all the flags are not processed, the hypervisor 20 selects the next flag and performs the processes at steps S1005 through S1070. When it is determined that all the flags have been processed, the hypervisor 20 terminates the process.

Figure 12:
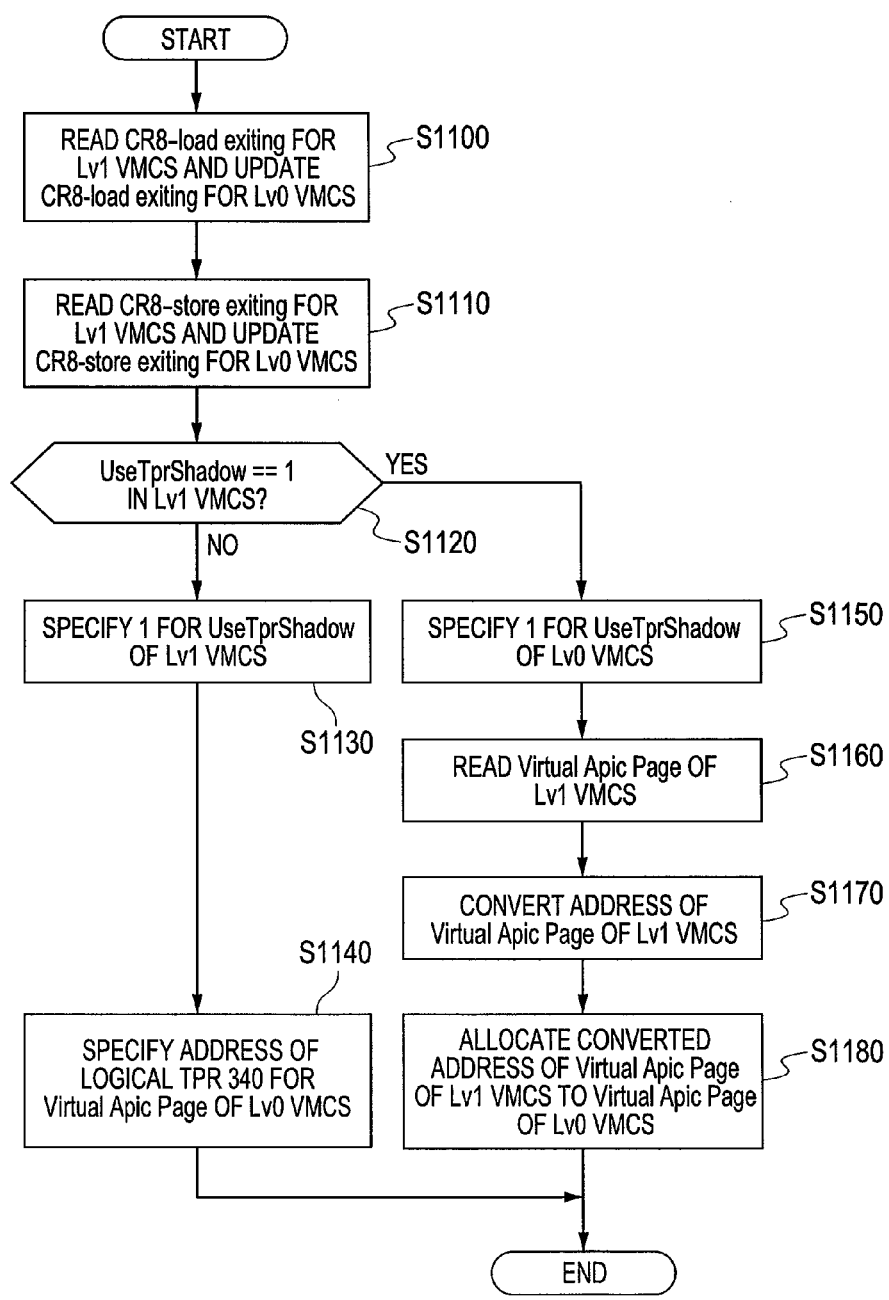
FIG. 12 is a flowchart showing an update process performed on TPR by the hypervisor according to the first embodiment of the invention.

FIG. 12 is a flowchart showing an update process performed on the TPR by the hypervisor 20 according to the first embodiment of the invention. The following description assumes that the TPR in the register emulation policy table 220 is assigned "shadowing" as the emulation policy 610. That is, the shadowing function is always used to manipulate the TPR.

The hypervisor 20 reads the intercept enable flag 715 of the entry "CR8-load exiting" as the intercept target name 710 from the intercept setting 540 for the Lv1 VMCS 500. The hypervisor 20 updates the intercept setting 440 for the Lv0 VMCS 400 based on the read intercept enable flag 715 (S1100).

Specifically, the hypervisor 20 allocates the read intercept enable flag 715 to the intercept enable flag 705 of the entry "CR8-load exiting" as the intercept target name 700.

The hypervisor 20 reads the intercept enable flag 715 of the entry "CR8-store exiting" as the intercept target name 710 from the intercept setting 540 for the Lv1 VMCS 500. The hypervisor 20 updates the intercept setting 440 for the Lv0 VMCS 400 based on the read intercept enable flag 715 (S1110).

Specifically, the hypervisor 20 allocates the read intercept enable flag 715 to the intercept enable flag 705 of the entry "CR8-store exiting" as the intercept target name 700.

The hypervisor 20 references the shadowing setting 530 for the Lv1 VMCS 500 and determines whether the shadowing function is enabled for the Lv1 VMM 40 to manipulate the TPR (S1120).

Specifically, the hypervisor 20 determines whether the entry "UseTprShadow" as the shadowing target name 670 in the shadowing function setting table 5301 has the shadowing enable flag 675 set to "1". When the shadowing enable flag 675 is set to "1", it is determined that the shadowing function is enabled for the Lv1 VMM 40.

When it is determined that the shadowing function is not enabled for the Lv1 VMM 40 to manipulate the TPR, the hypervisor 20 enables the shadowing function corresponding to the shadowing setting 430 of the Lv0 VMCS 400 for the TPR manipulation (S1130).

Specifically, the hypervisor 20 specifies value "1" for the shadowing enable flag 645 of the entry "UseTprShadow" as the shadowing target name 640 in the shadowing function setting table 4301.

The hypervisor 20 reads the logical TPR 340. The hypervisor 20 updates the shadowing setting 430 for the Lv0 VMCS 400 based on the read logical TPR 340 (S1140) and terminates the process.

Specifically, the hypervisor 20 allocates the memory address stored in the logical TPR 340 to the shadow data address 665 of the entry "Virtual Apic Page" as the shadow data name 660 in the shadow data setting table 4303.

At step S1120, it may be determined that the shadowing function is enabled for the Lv1 VMM 40 to manipulate the TPR. In this case, the hypervisor 20 enables the shadowing function corresponding to the shadowing setting 430 of the Lv0 VMCS 400 for the TPR manipulation (S1150). The same process as that at step S1130 is performed.

The hypervisor 20 then reads shadow data from the shadow data setting table 5303 in the shadowing setting 530 for the Lv1 VMCS 500 (S1160).

Specifically, the hypervisor 20 reads the memory address stored at a shadow data address 695 of the entry "Virtual Apic Page" as the shadowing target name 690 in the shadow data setting table 5303.

The hypervisor 20 converts the read shadow data address 695 into an address in the memory 90 (S1170). The process at step S1170 is needed because the read shadow data address 695 stores a memory address managed by the virtual machine 30 and differs from the actual address in the memory 90.

The hypervisor 20 stores the converted memory address in the shadow data setting table 4303 in the shadowing setting 430 for the Lv0 VMCS 400 (S1180) and terminates the process.

Specifically, the hypervisor 20 allocates the memory address converted at step S1170 to the shadow data address 665 for the entry "Virtual Apic Page" as the shadow data name 660 in the shadow data setting table 4303.

When the Lv2 guest OS 50 reads the TPR, the above-mentioned process reads the value allocated to the shadow data address 665 corresponding to the address of the memory 90.

If the processes in FIGS. 8 through 12 cause the same results, the process steps may be changed or replaced.

Figure 13:
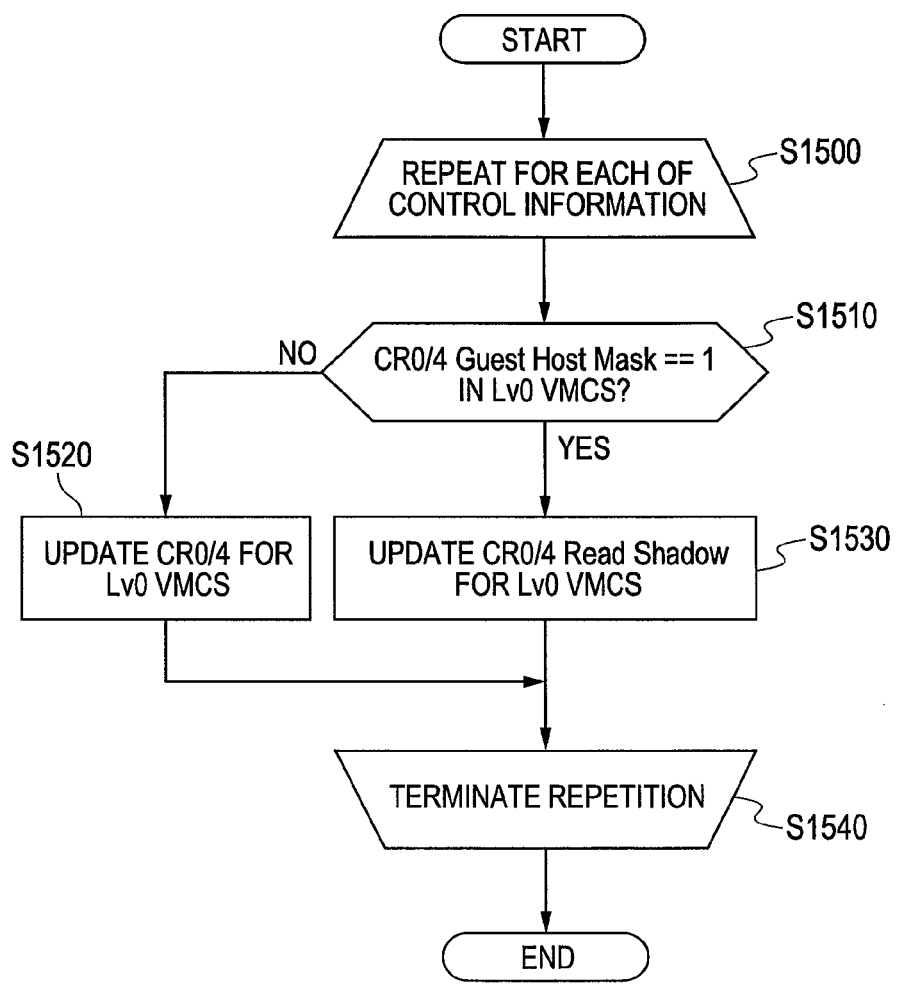
FIG. 13 is a flowchart showing an update process performed on CR0 or CR4 by the virtual machine according to the first embodiment of the invention.

FIG. 13 is a flowchart showing an update process performed on CR0 or CR4 by the virtual machine 30 according to the first embodiment of the invention. FIG. 13 shows the detail of the process at step S1240.

The hypervisor 20 performs the process at step S1240 when CR0 or CR4 is updated during execution of the Lv2 guest OS 50.

The hypervisor 20 selects a target flag for CR0 or CR4 from the guest state area 510 for the Lv1 VMCS 500 and performs the following process on the selected flag (S1500).

The hypervisor 20 references the shadowing setting 430 of the Lv0 VMCS 400 and determines whether the shadowing function is enabled for the selected flag (S1510).

Specifically, the hypervisor 20 references the shadowing function setting table 4301 and determines whether the shadowing enable flag 645 for the selected flag is set to "1".

When it is determined that the shadowing function is not enabled for the selected flag, the hypervisor 20 updates CR0 or CR4 in the guest state area 410 for the Lv0 VMCS 400 (S1520) and proceeds to step S1540.

Specifically, the hypervisor 20 allocates a value written by the Lv2 guest OS 50 to the control bit corresponding to the selected flag for the CR0 or CR4 in the guest state area 410 for the Lv0 VMCS 400.

This process allows the Lv2 guest OS 50 to directly read CR0 or CR4 from the guest state area 410 while the shadowing function is disabled.

When it is determined that the shadowing function is enabled for the selected flag, the hypervisor 20 updates the shadowing setting 430 for the Lv0 VMCS 400 (S1530) and proceeds to step S1540.

Specifically, the hypervisor 20 allocates a value written by the Lv2 guest OS 50 to the shadow data 655 for the selected flag in the shadow data setting table 4302.

This process allows the Lv2 guest OS 50 to directly read a value stored in the shadow data 655 instead of reading CR0 or CR4 while the shadowing function is enabled.

At step S1540, the hypervisor 20 determines whether all the flags have been processed. When all the flags are not processed, the hypervisor 20 selects the next flag and performs the processes at steps S1510 through S1540. When it is determined that all the flags have been processed, the hypervisor 20 terminates the process.

Figure 14:
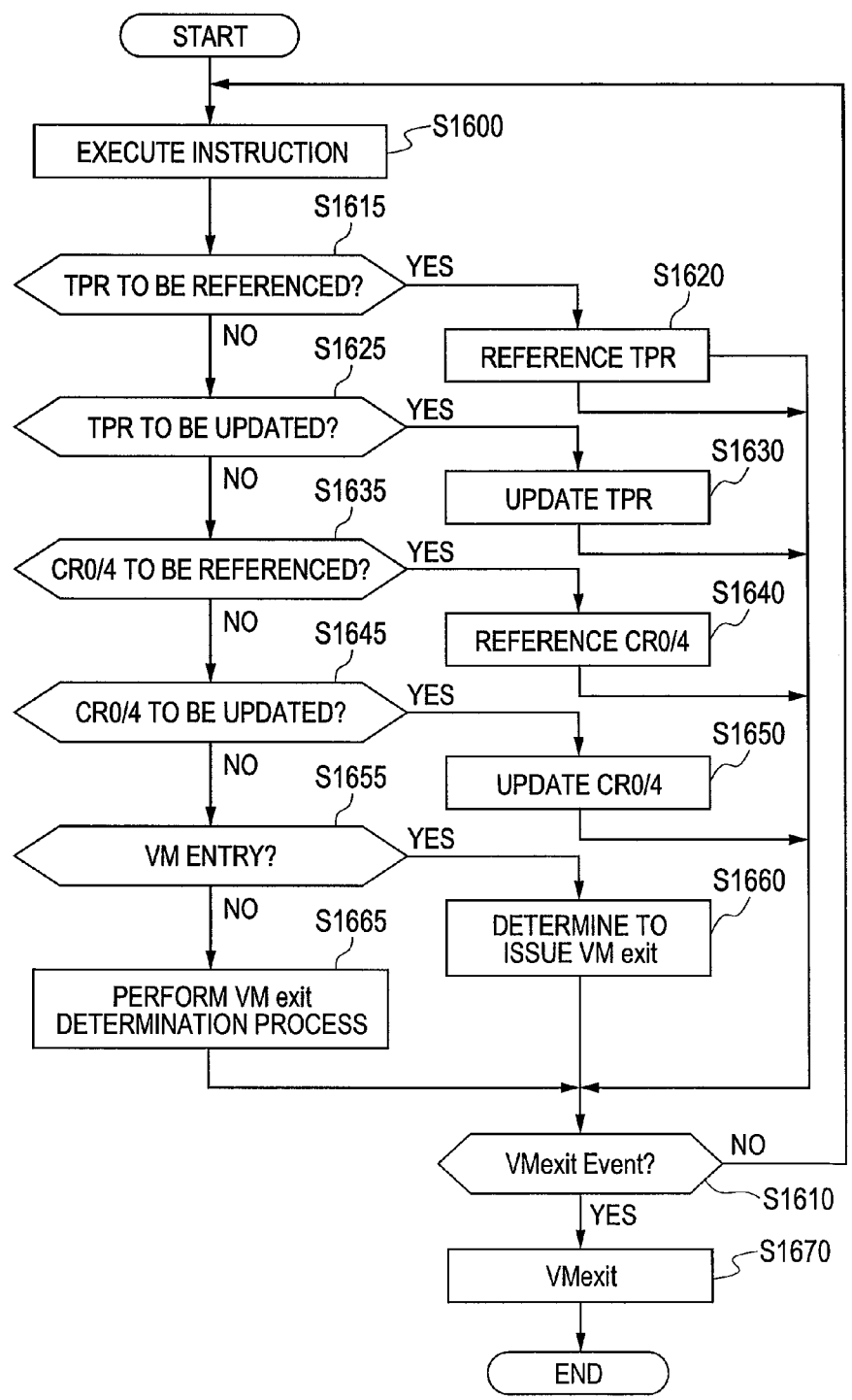
FIG. 14 is a flowchart showing a process performed by the CPU during execution of a guest instruction according to the first embodiment of the invention.

FIG. 14 is a flowchart showing a process performed by the CPU 70 during execution of a guest instruction according to the first embodiment of the invention. FIG. 14 shows the detail of the process at step S1290.

The CPU 70 executes a guest instruction (S1600). The following process depends on the process contents of the guest instruction.

The CPU 70 determines whether the guest instruction references the TPR (S1615).

When it is determined that the guest instruction references the TPR, the CPU 70 references the TPR (S1620) and proceeds to step S1610.

When it is determined that the guest instruction does not reference the TPR, the CPU 70 determines whether the guest instruction updates the TPR (S1625).

When it is determined that the guest instruction updates the TPR, the CPU 70 updates the TPR (S1630) and proceeds to step S1610.

When it is determined that the guest instruction does not update the TPR, the CPU 70 determines whether the guest instruction references CR0 or CR4 (S1635).

When it is determined that the guest instruction references CR0 or CR4, the CPU 70 references CR0 or CR4 (S1640) and proceeds to step S1610.

When it is determined that the guest instruction does not reference CR0 or CR4, the CPU 70 determines whether the guest instruction updates CR0 or CR4 (S1645).

When it is determined that the guest instruction updates CR0 or CR4, the CPU 70 updates CR0 or CR4 (S1650) and proceeds to step S1610.

When it is determined that the guest instruction does not update CR0 or CR4, the CPU 70 determines whether the guest instruction is equivalent to the VM entry instruction (S1655).

When it is determined that the guest instruction is equivalent to the VM entry instruction, the CPU 70 determines the need for issuing a VM exit to call the hypervisor 20 and pass control to it (S1660). The CPU 70 then proceeds to step S1610. This is because only the hypervisor 20 is allowed to execute the VM entry instruction.

When it is determined that the guest instruction is not equivalent to the VM entry instruction, the CPU 70 performs a VM exit determination process (S1665) and proceeds to step S1610. Specifically, the CPU 70 references the intercept setting 440 for the Lv0 VMCS 400 and determines whether the guest instruction causes a VM exit.

As a result of the above-mentioned process, the CPU 70 determines whether an event causing the VM exit is executed (S1610).

When it is determined that an event causing the VM exit is not executed, the CPU 70 returns to step S1600 and performs the same process on the guest instruction.

When it is determined that an event causing the VM exit is executed, the CPU 70 issues the VM exit instruction (S1670) and terminates the process. Specifically, the CPU 70 changes the VMX mode flag 110 to VMX root. The CPU 70 saves its state in the guest state area 410 for the Lv0 VMCS 400. The CPU 70 updates the Exit information area 450 of the Lv0 VMCS 400, reads the host state area 520 from the Lv1 VMCS 500, and starts executing the hypervisor 20.

Figure 15:
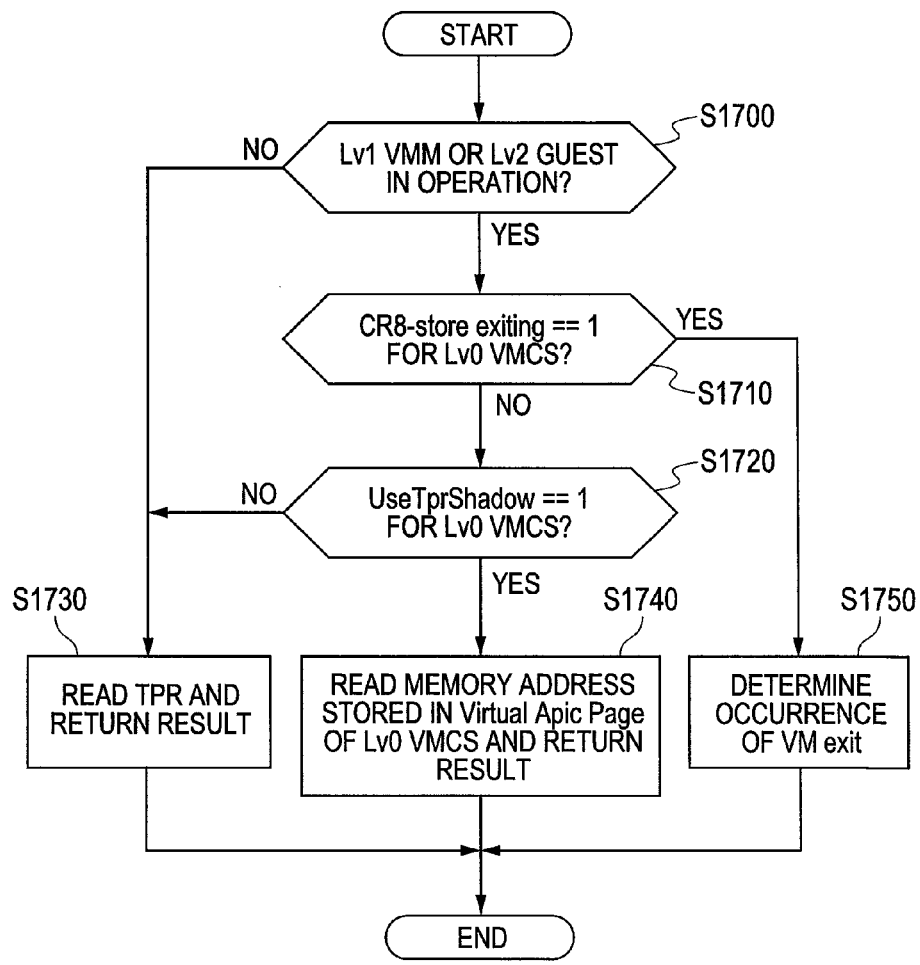
FIG. 15 is a flowchart showing details of a TPR reference process at step S1620 according to the first embodiment of the invention.

FIG. 15 is a flowchart showing details of the TPR reference process at step S1620 according to the first embodiment of the invention.

The CPU 70 references the VMX mode flag 110 and determines whether the Lv1 VMM 40 or the Lv2 guest OS 50 is active (S1700). When the VMX mode flag 110 indicates the "VMX root mode", it is determined that the VMM 40 or the Lv2 guest OS 50 is inactive. When the VMX mode flag 110 indicates the "VMX non-root mode", it is determined that the VMM 40 or the Lv2 guest OS 50 is active.

When it is determined that the VMM 40 or the Lv2 guest OS 50 is inactive, the CPU 70 proceeds to step S1730.

When it is determined that the VMM 40 or the Lv2 guest OS 50 is active, the CPU 70 references the intercept setting 440 of the Lv0 VMCS 400 and determines whether an intercept occurs on the TPR reference process (S1710). Specifically, the CPU 70 determines whether the intercept enable flag 705 is set to "1" for "CR8-store exiting" as the intercept target name 700.

When it is determined that an intercept occurs on the TPR reference process, the CPU 70 determines occurrence of a VM exit (S1750) and terminates the process.

When it is determined that an intercept does not occur on the TPR reference process, the CPU 70 references the shadowing setting 430 of the Lv0 VMCS 400 and determines whether the shadowing function is enabled for the TPR reference process (S1720). Specifically, the CPU 70 determines whether the shadowing enable flag 645 is set to "1" for "UseTprShadow" as the shadowing target name 640.

When it is determined that the shadowing function is enabled for the TPR reference process, the CPU 70 references shadowing setting 430 of the Lv0 VMCS 400, returns the result to Lv1 VMM 40 or the Lv2 guest OS 50 (S1740), and terminates the process.

Specifically, the CPU 70 reads the address stored at the shadow data address 665 for "Virtual Apic Page" as the shadow data name 660. The CPU 70 reads data corresponding to the read address from the memory 90 and returns the read data to the Lv1 VMM 40 or the Lv2 guest OS 50.

It may be determined that Lv1 VMM 40 or the Lv2 guest OS 50 is inactive or that the shadowing function is not enabled for the TPR reference process. In such a case, the CPU 70 reads the value stored in the TPR included in the privilege register 140, returns the read value to the Lv1 VMM 40 or the Lv2 guest OS 50 (S1730), and terminates the process.

Figure 16:
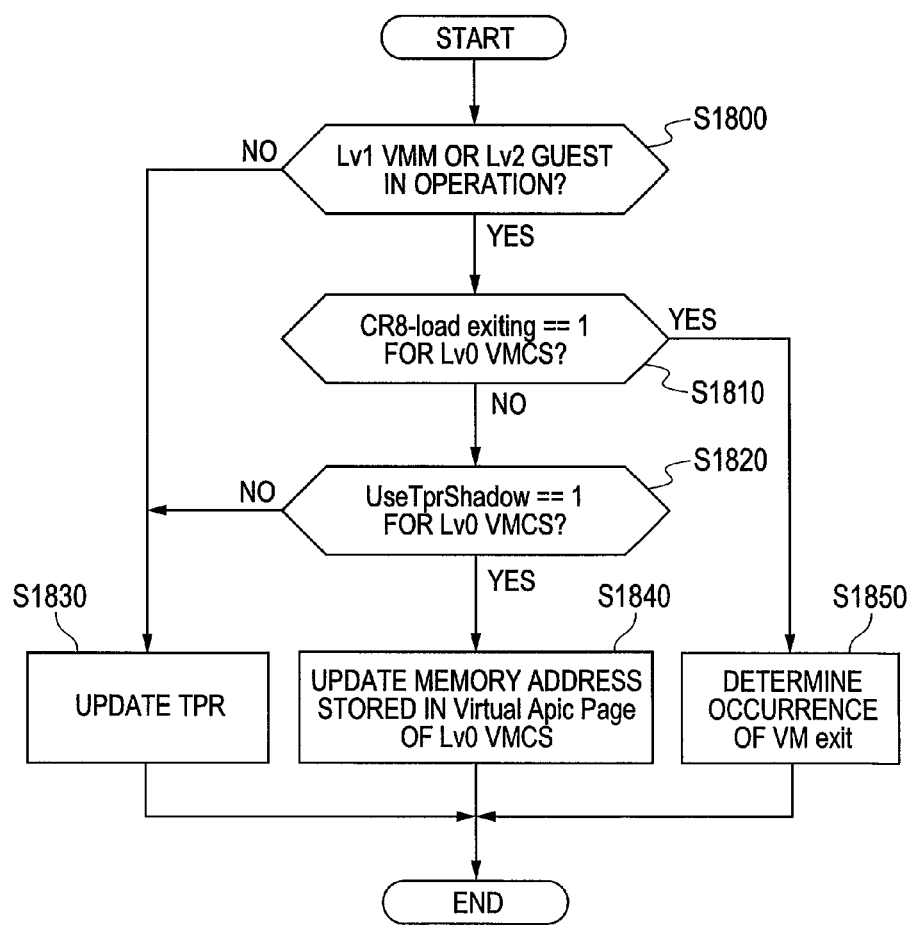
FIG. 16 is a flowchart showing details of a TPR reference process at step S1630 according to the first embodiment of the invention.

FIG. 16 is a flowchart showing details of the TPR reference process at step S1630 according to the first embodiment of the invention.

The CPU 70 references the VMX mode flag 110 and determines whether the Lv1 VMM 40 or the Lv2 guest OS 50 is active (S1800). When the VMX mode flag 110 indicates the "VMX root mode", it is determined that the VMM 40 or the Lv2 guest OS 50 is inactive. When the VMX mode flag 110 indicates the "VMX non-root mode", it is determined that the VMM 40 or the Lv2 guest OS 50 is active.

When it is determined that the VMM 40 or the Lv2 guest OS 50 is inactive, the CPU 70 proceeds to step S1730.

When it is determined that the VMM 40 or the Lv2 guest OS 50 is active, the CPU 70 references the intercept setting 440 of the Lv0 VMCS 400 and determines whether an intercept occurs on the TPR update process (S1810). Specifically, the CPU 70 determines whether the intercept enable flag 705 is set to "1" for "CR8-load exiting" as the intercept target name 700.

When it is determined that an intercept occurs on the TPR update process, the CPU 70 determines occurrence of a VM exit (S1850) and terminates the process.

When it is determined that an intercept does not occur on the TPR update process, the CPU 70 references the shadowing setting 430 of the Lv0 VMCS 400 and determines whether the shadowing function is enabled for the TPR update process (S1820). Specifically, the CPU 70 determines whether the shadowing enable flag 645 is set to "1" for "UseTprShadow" as the shadowing target name 640.

When it is determined that the shadowing function is enabled for the TPR update process, the CPU 70 references shadowing setting 430 of the Lv0 VMCS 400, updates the shadow data (S1840), and terminates the process.

Specifically, the CPU 70 reads the address stored at the shadow data address 665 for "Virtual Apic Page" as the shadow data name 660 and updates the data corresponding to the read address.

It may be determined that Lv1 VMM 40 or the Lv2 guest OS 50 is inactive or that the shadowing function is not enabled for the TPR update process. In such a case, the CPU 70 updates the value stored in the TPR included in the privilege register 140 (S1830) and terminates the process.

Figure 17:
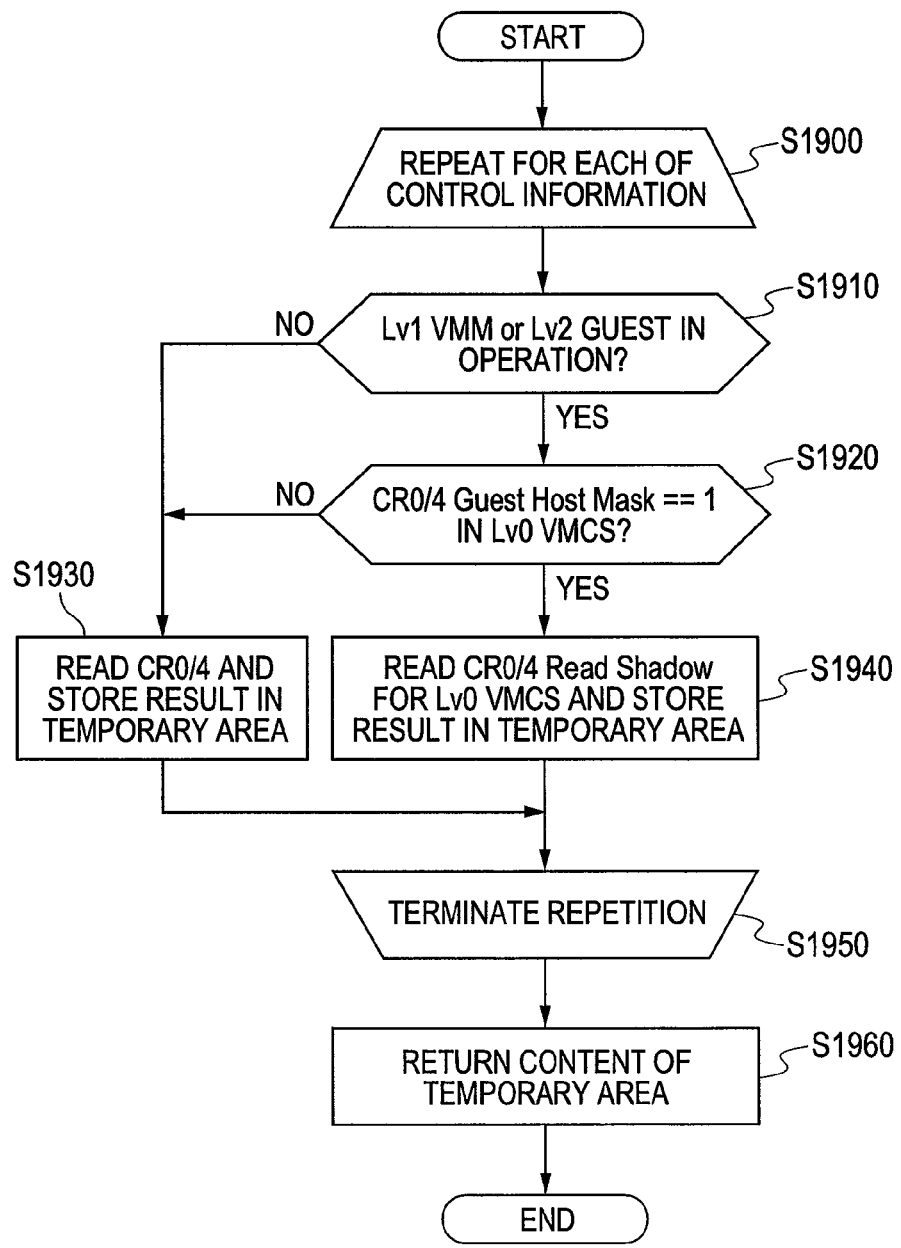
FIG. 17 is a flowchart showing details of a CR0 or CR4 reference process at step S1640 according to the first embodiment of the invention.

FIG. 17 is a flowchart showing details of the CR0 or CR4 reference process at step S1640 according to the first embodiment of the invention.

The CPU 70 selects the CR0 or CR4 flag to be processed from the guest state area 410 of the Lv0 VMCS 400 and performs the following process on the selected flag (S1900).

The CPU 70 references the VMX mode flag 110 and determines whether the Lv1 VMM 40 or the Lv2 guest OS 50 is active (S1910). When the VMX mode flag 110 indicates the "VMX root mode", it is determined that the VMM 40 or the Lv2 guest OS 50 is inactive. When the VMX mode flag 110 indicates the "VMX non-root mode", it is determined that the VMM 40 or the Lv2 guest OS 50 is active.

When it is determined that the VMM 40 or the Lv2 guest OS 50 is inactive, the CPU 70 proceeds to step S1930.

When it is determined that the VMM 40 or the Lv2 guest OS 50 is active, the CPU 70 references the shadowing setting 430 of the Lv0 VMCS 400 and determines whether the shadowing function is enabled for the selected flag (S1920). Specifically, the CPU 70 determines whether the shadowing enable flag 645 is set to "1" for the selected flag.

When it is determined that the shadowing function is enabled for the selected flag, the CPU 70 reads the value stored in the shadow data 655 for the control bit corresponding to the selected flag. The CPU 70 stores the read value in a temporary area (S1940) and proceeds to step S1950. The temporary area may be located in a pipeline, for example.

It may be determined that Lv1 VMM 40 or the Lv2 guest OS 50 is inactive or that the shadowing function is not enabled for the selected flag. In such a case, the CPU 70 reads the value stored in CR0 or CR4 included in the privilege register 140, stores the read result in the temporary area (S1930), and proceeds to step S1950.

At step S1950, the CPU 70 determines whether all the flags have been processed. When all the flags are not processed, the CPU 70 selects the next flag and performs the processes at steps S1900 through S1950.

When it is determined that all the flags have been processed, the CPU 70 merges the contents stored in the temporary area for each control bit, returns the contents of the temporary area to the Lv1 VMM 40 or the Lv2 guest OS 50 (S1960), and terminates the process.

Figure 18:
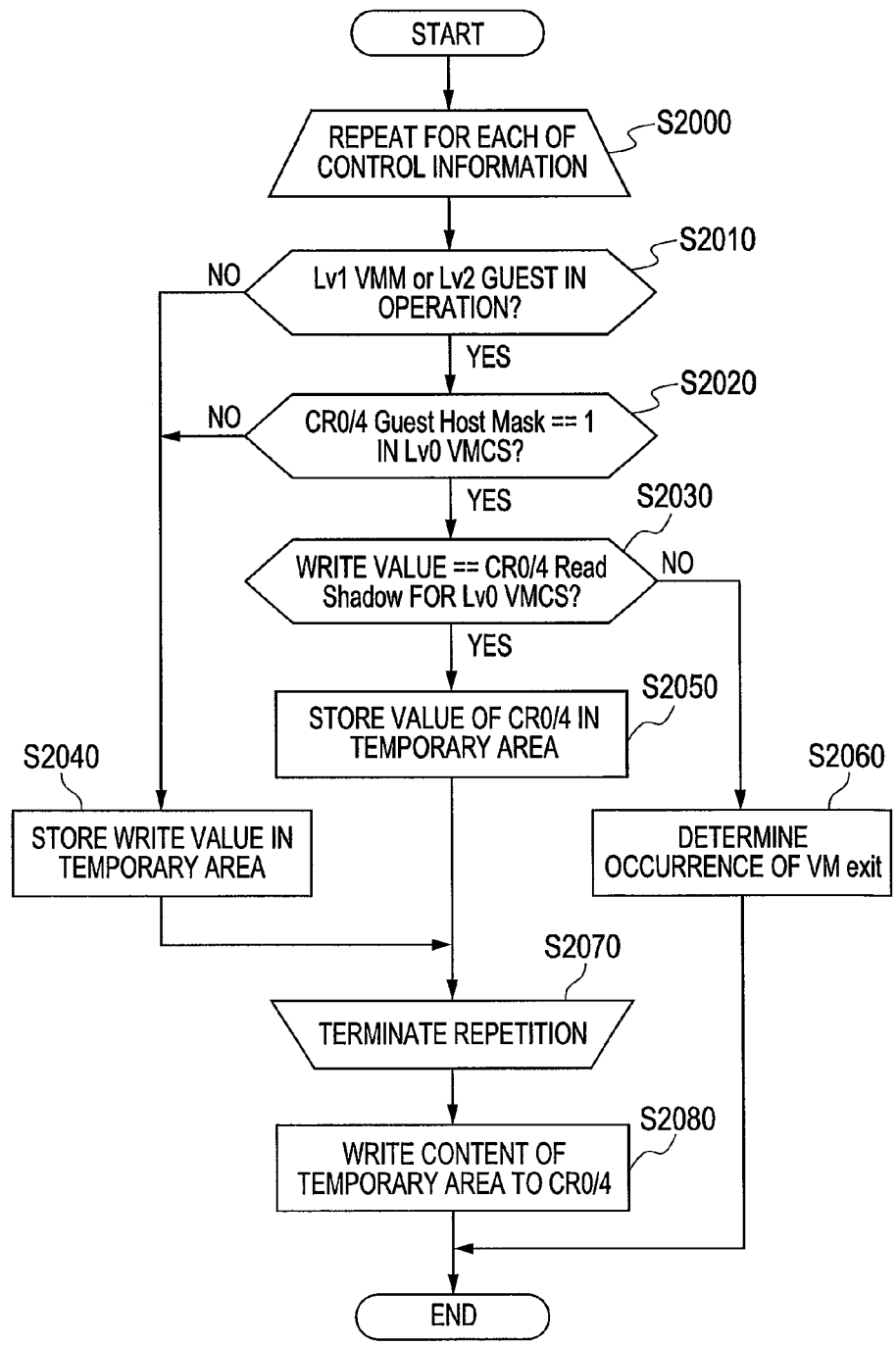
FIG. 18 is a flowchart showing details of a CR0 or CR4 update process at step S1650 according to the first embodiment of the invention.

FIG. 18 is a flowchart showing details of the CR0 or CR4 update process at step S1650 according to the first embodiment of the invention.

The CPU 70 selects the CR0 or CR4 flag to be processed from the guest state area 410 of the Lv0 VMCS 400 and performs the following process on the selected flag (S2000).

The CPU 70 references the VMX mode flag 110 and determines whether the Lv1 VMM 40 or the Lv2 guest OS 50 is active (S2010). When the VMX mode flag 110 indicates the "VMX root mode", it is determined that the VMM 40 or the Lv2 guest OS 50 is inactive. When the VMX mode flag 110 indicates the "VMX non-root mode", it is determined that the VMM 40 or the Lv2 guest OS 50 is active.

When it is determined that the VMM 40 or the Lv2 guest OS 50 is inactive, the CPU 70 proceeds to step S2040.

When it is determined that the VMM 40 or the Lv2 guest OS 50 is active, the CPU 70 references the shadowing setting 430 of the Lv0 VMCS 400 and determines whether the shadowing function is enabled for the selected flag (S2020). Specifically, the CPU 70 determines whether the shadowing enable flag 645 is set to "1" for the selected flag.

It may be determined that the shadowing function is not enabled for the selected flag or that Lv1 VMM 40 or the Lv2 guest OS 50 is inactive. In such a case, the CPU 70 stores the value written to the privilege register 140 in the temporary area (S2040), and proceeds to step S2070.

When it is determined that the shadowing function is enabled for the selected flag, the CPU 70 references the guest state area 410 of the Lv0 VMCS 400 and determines whether the value to be updated or written matches the shadow data (S2030). Specifically, the CPU 70 determines whether the value to be written matches a value stored in the shadow data 655 for the entry corresponding to the selected bit.

When it is determined that the value to be written does not match the shadow data, the CPU 70 determines occurrence of a VM exit (S2060) and terminates the process.

When it is determined that the value to be written matches the shadow data, the CPU 70 reads the selected flag value for CR0 or CR4 included in the privilege register 140, stores the read value in the temporary area (S2050), and proceeds to step S2070. This is because the update of CR0 or CR4 is inhibited when the shadowing function is enabled.

At step S2070, the CPU 70 determines whether all the flags have been processed. When all the flags are not processed, the CPU 70 selects the next flag and performs the processes at steps S2000 through S2070.

When it is determined that all the flags have been processed, the CPU 70 merges the contents stored in the temporary area for each control bit. The CPU 70 writes the merged result to the guest state area 410 of the Lv0 VMCS 400 (S2080) and terminates the process. That is, shadow data is written to a bit for which the shadowing function is enabled.

Second Embodiment

The second embodiment will be described.

The second embodiment equals the first embodiment with respect to the virtual machine system configuration and the software and hardware configuration and the description is omitted for simplicity.

The second embodiment differs from the first embodiment with respect to the process of shadowing setting for the TPR. The other processes equal to those of the first embodiment and the description is omitted for simplicity. The following mainly describes differences between the first and second embodiments.

Figure 19:
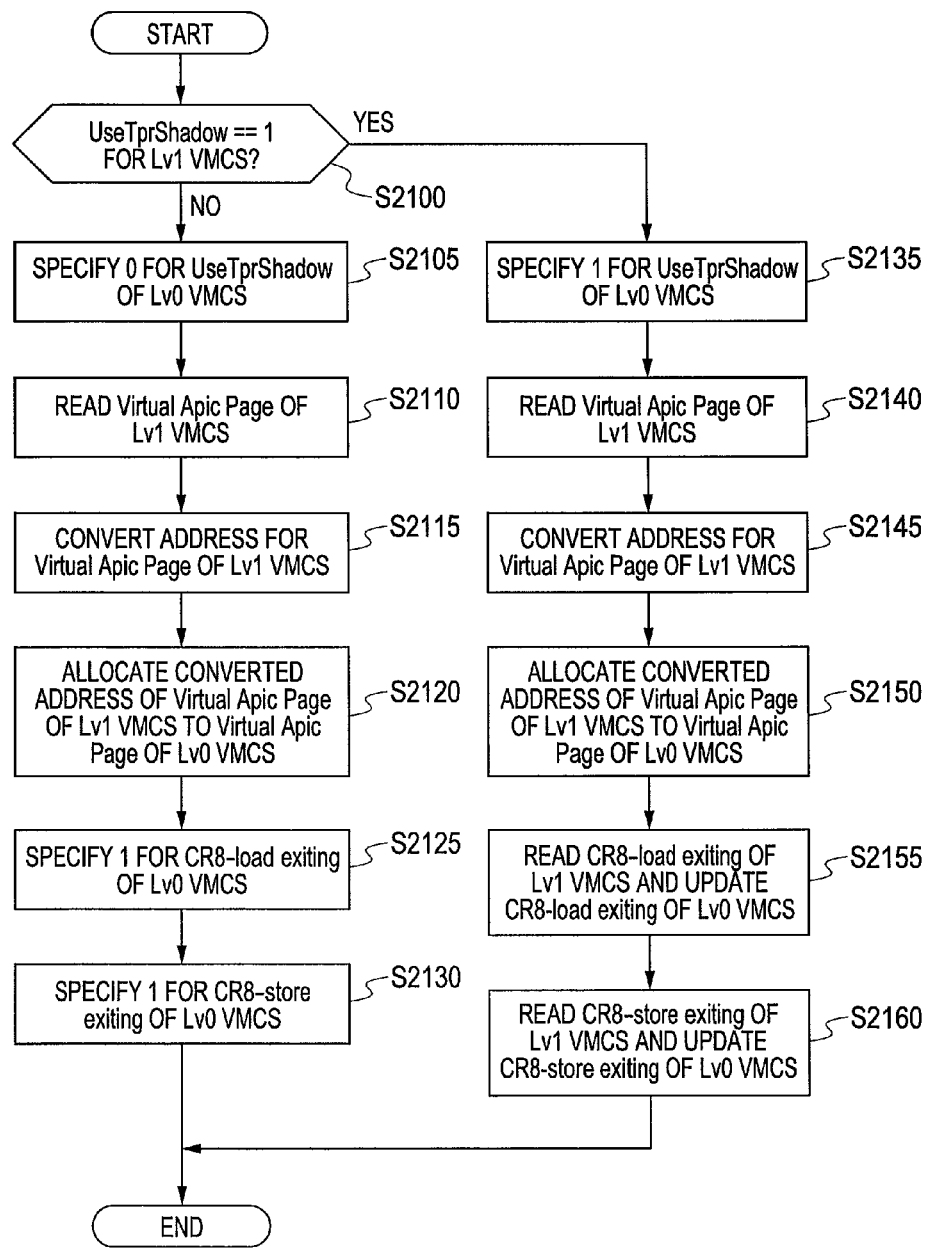
FIG. 19 is a flowchart showing an update process performed on TPR by the hypervisor according to a second embodiment of the invention.

FIG. 19 is a flowchart showing an update process performed on the TPR by the hypervisor 20 according to a second embodiment of the invention. The following description assumes the emulation policy 610 of the TPR to be "intercept" in the register emulation policy table 220. That is, no shadowing is used during the TPR manipulation.

The hypervisor 20 references the shadowing setting 530 of the Lv1 VMCS 500 and determines whether the shadowing function is enabled for the Lv1 VMM 40 to manipulate the TPR (S2100). Specifically, the hypervisor 20 determines whether the shadowing enable flag 675 is set to "1" for the entry "UseTprShadow" as the shadowing target name 670 in the shadowing function setting table 5301.

When it is determined that the shadowing function is not enabled for the Lv1 VMM 40 to manipulate the TPR, the hypervisor 20 disables the shadowing function for the TPR manipulation in the shadowing setting 430 of the Lv0 VMCS 400 (S2105).

Specifically, the hypervisor 20 sets the shadowing enable flag 645 to "0" for the entry "UseTprShadow" as the shadowing target name 640 in the shadowing function setting table 4301.

The hypervisor 20 reads, from the shadowing setting 530 of the Lv1 VMCS 500, an address to be stored in the shadow data address 695 for the entry "Virtual Apic Page" as the shadowing target name 690 (S2110).

The hypervisor 20 converts the read address into an address of the memory 90 (S2115) and allocates the converted address to the shadowing setting 430 of the Lv0 VMCS 400 (S2120). Specifically, the hypervisor 20 allocates the converted address to the shadow data address 695 for the entry "Virtual Apic Page" as the shadowing target name 690 in the shadow data setting table 5303.

The hypervisor 20 specifies "1" for each of the entries "CR8-load exiting" and "CR8-store exiting" as the intercept target name 710 in the intercept setting 540 (S2125, S2130) and terminates the process.

When it is determined that the shadowing function is enabled for the Lv1 VMM 40 to manipulate the TPR at S2100, the hypervisor 20 enables the shadowing function for the TPR manipulation in the shadowing setting 430 of the Lv0 VMCS 400 (S2135).

Specifically, the hypervisor 20 sets the shadowing enable flag 645 to "1" for the entry "UseTprShadow" as the shadowing target name 640 in the shadowing function setting table 4301.

The hypervisor 20 reads, from the shadowing setting 530 of the Lv1 VMCS 500, an address to be stored in the shadow data address 695 for the entry "Virtual Apic Page" as the shadowing target name 690 (S2140).

The hypervisor 20 converts the read address into an address of the memory 90 (S2145) and allocates the converted address to the shadowing setting 430 of the Lv0 VMCS 400 (S2150). Specifically, the hypervisor 20 allocates the converted address to the shadow data address 695 for the entry "Virtual Apic Page" as the shadowing target name 690 in the shadow data setting table 5303.

The hypervisor 20 reads, from the intercept setting 540 of the Lv1 VMCS 500, the value set to the intercept enable flag 715 for the entry "CR8-load exiting" as the intercept target name 710. The hypervisor 20 updates the intercept setting 440 of the Lv0 VMCS 400 based on the read value (S2155).

Specifically, the hypervisor 20 specifies the value read from the intercept setting 540 of the Lv1 VMCS 500 for the intercept enable flag 705 of the entry "CR8-load exiting" as the intercept target name 700.

The hypervisor 20 reads, from the intercept setting 540 of the Lv1 VMCS 500, the value set to the intercept enable flag 715 for the entry "CR8-store exiting" as the intercept target name 710. The hypervisor 20 updates the intercept setting 440 of the Lv0 VMCS 400 based on the read value (S2160) and terminates the process.

Specifically, the hypervisor 20 specifies the value read from the intercept setting 540 of the Lv1 VMCS 500 for the intercept enable flag 705 of the entry "CR8-store exiting" as the intercept target name 700.

At steps S2155 and S2160, the intercept setting 540 of the Lv1 VMCS 500 is reflected on the intercept setting 440 of the Lv0 VMCS 400.

The embodiment converts the shadow data address 695 for the entry "Virtual Apic Page" as the shadowing target name 690 of the Lv1 VMCS 500. The converted address is allocated to the shadow data address 665 for the entry "Virtual Apic Page" as the shadow data name 660 of the Lv0 VMCS 400.

The process from steps S2105 to S2130 provides an example of the process executed by the hypervisor 20. Varieties of the process may be available depending on specifications of the hypervisor 20.

What is claimed is:

1. A virtualization method for a machine having a processor and memory connected to the processor, the machine includes:
a first virtual machine manager that is executed by the processor and manages a plurality of virtual machines generated by virtually dividing a physical resource of the machine, and
a second virtual machine manager that is executed on each of the virtual machines and respectively manages an operating system to respectively execute an application,
wherein the memory includes:
first management information and second management information, the first management information is stored in the memory by the first virtual machine manager and manages a status of the first virtual machine manager and the second virtual machine manager, and the second management information is stored in the memory by the second virtual machine manager and manages a status of the second virtual machine manager and one of the respective operating system and the respective application, and
wherein the processor includes:
a register to store control information for controlling the processor, and a shadowing function to read a particular address of the memory, indicated by the first management information in accordance with a read operation on the register when first shadowing information, included in the first management information, indicates active status,
the virtualization method comprising:
detecting, by the first virtual machine manager, a call from the second virtual machine manager based on an activation of one of the operating system or the application managed by the second virtual machine manager;

determining, by the first virtual machine manager, whether second shadowing information, which is included in the second management information, indicates active status or not;

changing, by the first virtual machine manager, the first shadowing information to indicate active status when it is determined that the second shadowing information indicates active status;

converting, by the first virtual machine manager, a second address, which is included in the second management information and uniquely identifies a location of address space of the memory allocated to the virtual machine corresponding to the second virtual machine manager, to a first address which uniquely identifies an address location in the memory;

storing, by the first virtual machine manager, the first address to the first management information in the memory;

activating, by the first virtual machine manager, the one of the operating system or the application managed by the second virtual machine manager;

sending, by the processor, a specified value, read from the first address of the memory based on the first management information, to the one of the operating system or the application managed by the second virtual machine manager in accordance with a read operation on the register from the one of the operating system or the application managed by the second virtual machine manager;

detecting a write request issued to the register from one of the operating system and the application; and using the shadowing function and writing the specified value to the first address, wherein the specified value corresponds to a value to be written in accordance with a write request issued to the register from one of the operating system and the application.

2. The virtualization method according to claim 1, wherein the shadowing function further includes a function to write a specified value to the first address when the processor detects a write operation on the register.

3. The virtualization method according to claim 1, wherein the first management information includes first shadow data to be read by the shadowing function;

wherein the second management information includes second shadow data to be read by the shadowing function;

wherein the method further comprises:

reading the second shadow data from the second management information;

updating the first shadow data included in the first management information based on the second shadow data being read;

detecting a read request issued to the register from one of the operating system and the application; and using the shadowing function and reading, from the first shadow data of the first management information, a target value for a read request issued to the register from one of the operating system and the application; and returning the read target value to one of the operating system and the application.

4. The virtualization method according to claim 3, wherein the machine includes an emulation policy table stored in the memory by the first virtual machine manager while the emulation policy table defines: emulation policy for the register manipulated by the second virtual machine manager; and a value to be maintained for the register;

wherein the method further comprises:

referencing the emulation policy table when it is determined at the third step that an instruction for enabling the shadowing function does not cause a call from the second virtual machine manager;

determining whether emulation policy corresponding to a call from the second virtual machine manager indicates a process using the shadowing function;

enabling the shadowing function for reading the first management information when it is determined that emulation policy corresponding to a call from the second virtual machine manager indicates a process using the shadowing function; and specifying the return value for the first shadow data included in the first management information.

5. The virtualization method according to claim 4, wherein the register includes second control information including a plurality of pieces of control information;

wherein the shadowing function is capable of being enabled for each of the pieces of second control information;

wherein the method further comprises:

determining whether the processor enables the shadowing function for each of the second control information at the eighth step;

reading, from the register, information corresponding to the second control information for which the shadowing function is determined not to be enabled; and reading, from the first management information, information corresponding to the second control information for which the shadowing function is determined to be enabled.

6. The virtualization method according to claim 3, wherein the register includes first control information for the processor to maintain an execution priority of software stored in the memory;

wherein the memory includes a first address space for uniquely identifying a location in the memory;

wherein the virtual machine includes a second address space for uniquely identifying a location of virtual memory allocated to the memory;

wherein the first shadow data stores a first address included in the first address as a value for the first control information;

wherein the second shadow data stores a second address included in the second address space as a value for the first control information;

wherein the method further comprises:

receiving an update request for the first control information from the second virtual machine manager;

enabling the shadowing function for the first virtual machine manager when the first virtual machine manager receives the update request;

using the shadowing function and reading the first address from the first shadow data;

converting the first address being read into the second address that is included in the second address space and corresponds to the first address being read; and storing a second address corresponding to the first address being read in the first control information.

7. The virtualization method according to claim 1, wherein the register is equivalent to a plurality of privilege registers for controlling status of the processor.

8. A machine comprising:

a processor; and memory connected to the processor, the memory storing instructions which cause the processor to execute a first virtual machine manager that is loaded into the memory and manages a plurality of virtual machines to be generated by virtually dividing a physical resource of the machine, and each of the virtual machines executes a second virtual machine manager for respectively managing an operating system that respectively executes an application, wherein the first virtual machine manager stores first management information in the memory for managing status of the first virtual machine manager and the second virtual machine manager, wherein the second virtual machine manager stores second management information in the memory for managing status of the second virtual machine manager and one of the respective operating system and the respective application, wherein the processor detects a write request to a register issued from one of the operating system and the application, wherein the processor includes:

the register to store control information for controlling the processor, and a shadowing function to read a particular address of the memory, indicated by the first management information in accordance with a read operation on the register when first shadowing information, included in the first management information, indicates active status, and wherein the memory has instructions to further cause the processor to perform acts comprising:

detecting, by the first virtual machine manager, a call from the second virtual machine manager based on an activation of one of the operating system or the application managed by the second virtual machine manager;

determining, by the first virtual machine manager, whether second shadowing information, which is included in the second management information, indicates active status or not;

changing, by the first virtual machine manager, the first shadowing information to indicate active status when it is determined that the second shadowing information indicates active status;

converting, by the first virtual machine manager, a second address, which is included in the second management information and uniquely identifies a location of address space of the memory allocated to the virtual machine corresponding to the second virtual machine manager, to a first address which uniquely identifies an address location in the memory;

storing, by the first virtual machine manager, the first address to the first management information in the memory;

activating, by the first virtual machine manager, the one of the operating system or the application managed by the second virtual machine manager;

sending, by the processor, a specified value, read from the first address of the memory based on the first management information, to the one of the operating system or the application managed by the second virtual machine manager in accordance with a read operation on the register from the one of the operating system or the application managed by the second virtual machine manager; and using the shadowing function and writing the specified value to the first address, wherein the specified value corresponds to a value to be written in accordance with a write request issued to the register from one of the operating system and the application.

9. The machine according to claim 8, wherein the shadowing function further writes a specified value to the first address when the processor detects a write operation to the register.

10. The machine according to claim 8, wherein the first management information includes first shadow data to be read by the shadowing function;

wherein the second management information includes second shadow data to be read by the shadowing function;

wherein the acts further comprise:

reading the second shadow data from the second management information;

updating the first shadow data included in the first management information based on the second shadow data being read;

detecting a read request issued to the register from one of the operating system and the application;

using the shadowing function and reading, from the first shadow data of the first management information, a target value for a read request issued to the register from one of the operating system and the application; and returning the read target value to one of the operating system and the application.

11. The machine according to claim 10, wherein the first virtual machine manager stores an emulation policy table in the memory while the emulation policy table defines: an emulation policy for the register manipulated by the second virtual machine manager; and a value to be maintained for the register;

wherein the acts further comprise:

referencing the emulation policy table when it is determined that an instruction for enabling the shadowing function does not cause a call from the second virtual machine manager;

determining whether emulation policy corresponding to a call from the second virtual machine manager indicates a process using the shadowing function;

enabling the shadowing function when it is determined that emulation policy corresponding to a call from the second virtual machine manager indicates a process using the shadowing function; and specifying the return value for the first shadow data included in the first management information.

12. The machine according to claim 11, wherein the register includes second control information including a plurality of pieces of control information;

wherein the shadowing function is capable of being enabled for each of the pieces of second control information;

wherein the acts further comprise:

determining whether to enable a shadowing function for each of the second control information when it is determined that emulation policy corresponding to a call from the second virtual machine manager indicates a process using the shadowing function;

reading, from the register, information corresponding to the second control information for which the shadowing function is determined not to be enabled; and reading, from the first management information, information corresponding to the second control information for which the shadowing function is determined to be enabled.

13. The machine according to claim 10, wherein the register includes first control information for the processor to maintain an execution priority of software stored in the memory;

wherein memory included in the machine includes a first address space for uniquely identifying a location in memory;

wherein the virtual machine includes a second address space for uniquely identifying a location of virtual memory allocated to the memory;

wherein the first shadow data stores a first address included in the first address as a value for the first control information;

wherein the second shadow data stores a second address included in the second address space as a value for the first control information;

wherein the acts further comprise:

receiving an update request for the first control information from the second virtual machine manager;

when receiving the update request, enabling the shadowing function for the first virtual machine manager;

using the shadowing function and reading the first address from the first shadow data;

converting the first address being read into a second address that is included in the second address space and corresponds to the first address being read; and storing a second address corresponding to the first address being read in the first control information.

14. The machine according to claim 8, wherein the register is equivalent to a plurality of privilege registers for controlling status of the processor.

* * * * *